(12) United States Patent
White et al.

(10) Patent No.: US 11,299,627 B2
(45) Date of Patent: Apr. 12, 2022

(54) POLYAMIDE COMPOSITIONS AND PLATING APPLICATIONS THEREOF

(71) Applicant: Ascend Performance Materials Operations LLC, Houston, TX (US)

(72) Inventors: Kimberly M. White, Pensacola, FL (US); Scott E. Powers, Rockford, MI (US); Jacob G. Ray, Pace, FL (US); Bradley J. Sparks, Pace, FL (US)

(73) Assignee: Ascend Performance Materials Operations LLC, Houston, TX (US)

( * ) Notice: Subject to any disclaimer, the term of this patent is extended or adjusted under 35 U.S.C. 154(b) by 46 days.

(21) Appl. No.: 16/455,278

(22) Filed: Jun. 27, 2019

(65) Prior Publication Data
US 2020/0002532 A1  Jan. 2, 2020

Related U.S. Application Data

(60) Provisional application No. 62/690,752, filed on Jun. 27, 2018.

(51) Int. Cl.

| | | |
|---|---|---|
| *C08L 77/02* | (2006.01) | |
| *B29C 45/00* | (2006.01) | |
| *C08K 3/013* | (2018.01) | |
| *C08K 3/014* | (2018.01) | |
| *C08K 3/016* | (2018.01) | |
| *C08K 3/34* | (2006.01) | |
| *C08K 5/00* | (2006.01) | |
| *C08K 5/3465* | (2006.01) | |
| *C08K 9/06* | (2006.01) | |
| *B29K 77/00* | (2006.01) | |
| *C08K 3/22* | (2006.01) | |

(52) U.S. Cl.
CPC .......... *C08L 77/02* (2013.01); *B29C 45/0001* (2013.01); *C08K 3/013* (2018.01); *C08K 3/014* (2018.01); *C08K 3/016* (2018.01); *C08K 3/346* (2013.01); *C08K 5/0091* (2013.01); *C08K 5/3465* (2013.01); *C08K 9/06* (2013.01); *B29K 2077/00* (2013.01); *C08K 2003/2224* (2013.01); *C08L 2201/08* (2013.01)

(58) Field of Classification Search
CPC ......... C08L 77/02; C08L 77/00; C08K 3/014; C08K 3/013; C08K 3/016; C08K 3/346; C08K 5/3465; C08K 5/0091; C08K 9/06; C08K 2003/2224; C08K 2201/08; C08K 3/34; B29C 45/0001; B29K 2077/00
USPC ............................................................ 524/89
See application file for complete search history.

(56) References Cited

U.S. PATENT DOCUMENTS

| | | | | |
|---|---|---|---|---|
| 5,030,689 | A  * | 7/1991 | Plachetta | C08L 77/00 525/66 |
| 5,081,222 | A  * | 1/1992 | Reimann | C08G 69/265 528/324 |
| 5,412,017 | A  * | 5/1995 | Gareiss | C08G 69/28 524/436 |
| 5,482,985 | A  * | 1/1996 | Baierweck | C08K 3/22 524/101 |
| 9,133,322 | B2 * | 9/2015 | Roth | C08K 5/42 |
| 2004/0102559 | A1* | 5/2004 | Oyamada | C08K 3/34 524/445 |
| 2007/0270531 | A1* | 11/2007 | Bossennec | D01F 6/60 524/217 |

FOREIGN PATENT DOCUMENTS

| | | |
|---|---|---|
| CN | 103642212 | 3/2014 |
| CN | 104693795 | 6/2015 |
| CN | 105219071 | 1/2016 |

OTHER PUBLICATIONS

International Application No. PCT/US2019/039520, "International Search Report and Written Opinion", dated Oct. 2, 2019, 10 pages.

\* cited by examiner

*Primary Examiner* — Josephine L Chang
(74) *Attorney, Agent, or Firm* — Cozen O'Connor

(57) ABSTRACT

The present disclosure relates to polyamide compositions and resulting injection-molded articles that can be plated, e.g., metal coated, to form aesthetic injection-molded articles. The polyamide compositions may include from 45 wt. % to 75 wt. % of an polyamide, from 2 wt. % to 40 wt. % of an etchable filler, from 10 wt. % to 40 wt. % of a semi-structural mineral, and optionally from 0.1 wt. % to 13 wt. % of additive. The polyamide composition imparts very good surface appearance to injection-molded articles that are substantially free of visual defects.

19 Claims, No Drawings

POLYAMIDE COMPOSITIONS AND PLATING APPLICATIONS THEREOF

CROSS-REFERENCE TO RELATED APPLICATION

This application claims the benefit of and the priority to U.S. Provisional Application No. 62/690,752, filed on Jun. 27, 2018, which is hereby incorporated by reference in its entirety for all purposes.

FIELD

The present disclosure generally relates to polyamide compositions. In particular, the present disclosure relates to polyamide compositions for metal-plated injection-molded articles exhibiting a very good surface appearance, e.g., smoothness and distinctness of image, and improved mechanical properties.

BACKGROUND

Polyamide compositions are used in various applications because of their excellent mechanical properties. In particular, polyamide compositions including reinforcement fillers remarkably improve the strength and rigidity of injection-molded articles. For example, polyamide compositions may comprise reinforcement fillers, e.g., glass fibers, to improve mechanical properties or to reduce the costs of the material. The use of high glass loadings in thermoplastic materials tends to increase stiffness, e.g., tensile and flexural modulus, and strength, e.g., tensile and flexural strength of the reinforced plastic. High glass loadings, however, may have a negative effect on the surface quality and aesthetics of injection-molded articles.

Particulate fillers are often added to polyamide compositions in order to achieve a desired surface appearance for injection-molded articles. Adding particulate filler materials to glass fiber reinforced polyamide compositions, however, significantly impairs mechanical characteristics, in particular reducing tensile strength, ultimate elongation, and impact resistance. This results in a composition wherein little or no particulate filler material is allowed to bind the glass fibers and the tensile strength and impact resistance of the molded part is reduced. On one hand, the addition of particulate filler material to glass fiber reinforced injection-molded articles results in the desired pigmentation or functionality, yet on the other hand, it leads to deterioration in terms of mechanical characteristics, e.g., tensile strength and impact resistance.

Furthermore, if glass fibers and/or particulate fillers are present in large amounts, the surface appearance of the articles may become unsatisfactory, e.g., from an aesthetic perspective. In many applications, it is necessary for the polyamide compositions to form injection-molded articles having desired surface qualities, e.g., shine or reflectivity. For example, parts for the automotive sector require injection-molded articles with metal-like properties which are achieved through highly filled reinforced molding compounds. But, after molding, the glass fibers and/or particulate fillers on the exterior surface of the article produce a dull or matted finish, and these fibers interfere with the adhesion of a subsequent painting or plating application that otherwise would cover the fibers. In the case of parts with thin walls, a high flow length of the molding compounds is necessary, but this cannot be achieved at all or can only be achieved poorly when using glass fibers.

Other types of filled or reinforced plastic materials suffer from similar problems. Traditional "high modulus" materials contain glass, or mica, or other fillers that are capable of increasing the modulus, or stiffness, of the material. Examples include glass filled polybutylene terephthalate (PBT), polyamide (PA), acrylonitrile butadiene styrene (ABS), polycarbonate/acrylonitrile butadiene styrene (PC/ABS), polypropylene (PP), etc. The addition of fillers, however, also has an adverse effect on the surface quality of the part. Therefore, these types of materials are molded in low gloss, textured applications. These parts can also be painted, but a primer is typically needed to cover the surface imperfections prior to the top-coat paint layer. Because of the problems associated with the fillers, "aesthetic" materials are typically unfilled amorphous resins that can be easily molded-in-color, painted or metal plated. These materials include unfilled PBT, PA, ABS, PC/ABS, PP, polyphenylene oxide (PPO), etc. Unfortunately, these materials do not provide the structural strength necessary for many metal replacement applications.

There is still a growing demand for polyamides which could provide better mechanical properties, reduced wear, in addition to excellent surface appearance with the possibility of more complex designs, and enable improvements in productivity, cost saving and alternative designs.

SUMMARY

According to one embodiment, the present disclosure relates to a polyamide composition comprising: from 45 wt. % to 75 wt. % of a polyamide; from 2 wt. % to 40 wt. % of an etchable filler; from 10 wt. % to 40 wt. % of a semi-structural mineral; and optionally from 0.1 wt. % to 13 wt. % of additive; wherein the semi-structural mineral and/or etchable filler does not include mica or wollastonite; wherein the composition has an R-value of least 10 as measured by Byk Gardner Wave Scan meter. In some embodiments, the polyamide comprises one or more of PA-6, PA-6,6, PA4,6, PA-6,9, PA-6,10, PA-6,12, PA11, PA12, PA9,10, PA9,12, PA9,13, PA9,14, PA9,15, PA-6,16, PA9,36, PA10,10, PA10,12, PA10,13, PA10,14, PA12,10, PA12,12, PA12,13, PA12,14, PA-6,14, PA-6,13, PA-6,15, PA-6,16, PA-6,13, PAMXD,6, PA4T, PA5T, PA-6T, PA9T, PA10T, PA12T, PA4I, PA5I, PA-6I, PA10I, copolymers, terpolymers, and mixtures thereof. In some embodiments the polyamide is a copolymer comprising PA-6,6 and PA-6, wherein the copolymer comprises PA-6 ranging from 2 wt. % to 20 wt. %. In some embodiments, the additive includes at least one of: inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, fibrous materials and particulate fillers. In some embodiments, the additive comprises from 1 wt. % to 10 wt. % of pigment, from 0.05 wt. % to 1 wt. % of lubricant, and/or from 0.25 wt. % to 2 wt. % of processing aid. In some embodiments, the pigment comprises a thermally stable nigrosine and wherein the lubricant comprises zinc stearate. In some embodiments, the etchable filler is coated with one or more of an organosilane coating, a vinylsilane coating, or an aminosilane coating, wherein the etchable filler comprises one or more of magnesium hydroxide or calcium carbonate. In some embodiments, the composition does not comprise any glass fibers. In some embodiments, the semi-structural mineral comprises one or more of kaolin or talc. In some embodiments, the composition has a distinctness of image of at least 85 as measured by Byk Gardner Wave Scan meter. In some embodiments, the composition has an R-value of least 10.5 as measured by Byk Gardner Wave Scan meter. In some embodiments, the composition has a density less than 1.5 g/cm$^3$, and wherein the composition has a melting point ranging from 220° C. to 260° C. In some embodiments, the polyamide is a copolymer comprising PA-66 and PA-6, wherein the copolymer comprises PA-6 ranging from 2 wt. % to 20 wt. %, wherein the composition has a distinctness of image of at least 90 as measured by Byk Gardner Wave Scan meter, wherein the composition has an R-value of least 10.5 as measured by Byk Gardner Wave Scan meter. In some embodiments, the polyamide is a copolymer comprising PA-6,6, PA-6I, or PA-6, wherein the semi-structural mineral comprises kaolin, wherein the composition has a density less than 1.5 g/cm$^3$, wherein the composition has a distinctness of image of at least 90 as measured by Byk Gardner Wave Scan meter, wherein the composition has an R-value of least 10.5 as measured by Byk Gardner Wave Scan meter. In some embodiments, an injection-molded article can be formed from the compositions described herein. In some embodiments, the injection-molded article is plated with a metal comprising one or more of copper, manganese, tin, nickel, iron, chrome, zinc, gold, platinum, cobalt, phosphorus, aluminum, and alloys thereof. In some embodiments, the injection-molded article is plated with chrome in the absence of hexavalent chromium.

In some embodiments, the present disclosure relates to a polyamide composition comprising: from 45 wt. % to 75 wt. % of an polyamide; from 2 wt. % to 40 wt. % of a silane-coated magnesium hydroxide; from 10 wt. % to 40 wt. % of kaolin; and optionally from 0.1 wt. % to 13 wt. % of additive, wherein the semi-structural mineral and/or etchable filler does not include mica or wollastonite; wherein the composition has a distinctness of image of at least 85 as measured by Byk Gardner Wave Scan meter and a tensile strength of at least 63 MPa. In some embodiments, the additive comprises from 0.5 wt. % to 5 wt. % of nigrosine, from 0.05 wt. % to 1 wt. % of zinc stearate, from 0.25 wt. % to 2 wt. % of a substituted piperidine compound. In some embodiments, the additive further comprises a nucleating agent.

DETAILED DESCRIPTION

Introduction

In general, the present disclosure relates to polyamide compositions and resulting injection-molded articles that can be plated, e.g., metal coated, to form injection-molded articles having desirable aesthetic properties. In some embodiments, the polyamide composition comprises from 45 wt. % to 75 wt. % of a polyamide, from 2 wt. % to 40 wt. % of an etchable filler, from 10 wt. % to 40 wt. % of a semi-structural mineral, and optionally from 0.1 wt. % to 13 wt. % of additive. In some aspects, the polyamide composition comprises few if any glass fibers. The polyamide composition includes a specific combination of polyamides, fillers, e.g., etchable fillers, semi-structural minerals, and additives (optionally) that have been found to impart a synergistic combination of very good surface appearance along with excellent mechanical properties. Additionally, the resulting injection-molded article can be plated to form an article that is substantially free of visual defects on the surface of the article caused by glass fibers in conventional polymer compositions. The polyamide composition also beneficially provides improved mechanical properties, e.g., denser feel, compared to conventional non-structural components, e.g., ABS, PC/ABS.

As discussed above, some conventional polymer compositions for injection molding applications cannot achieve good surface appearance qualities while maintaining desirable mechanical properties. For example, conventional polymer compositions disclose adding glass fibers in high concentrations to improve mechanical properties, e.g., peel strength, density, and stiffness, of the resulting molding product. Polyamide compositions having glass fibers, however, suffer from surface appearance defects. For example, the resulting injection-molded products will have poor appearance due to emergence of the glass fiber on the molded article surface.

As noted above, aesthetic materials are typically unfilled amorphous resins that can be easily molded-in-color, painted or metal plated. These materials include unfilled PBT, PA, ABS, PC/ABS, PP, polyphenylene oxide (PPO), etc. Again, however, these materials do not provide the structural strength necessary for many metal replacement applications.

It has now been surprisingly and unexpectedly found that polyamide compositions having specific amounts of polyamide, surface-treated etchable fillers, minerals, and optional additives, form injection-molding articles that demonstrate both improved aesthetic and mechanical properties without any, or very little, glass fibers present in the polyamide composition. The synergistic combination of components of the polyamide composition improve the surface appearance of injection-molded articles, while providing improved mechanical properties without any glass fibers. It has been found that polyamide compositions including the aforementioned components, improve surface appearance as characterized by the orange peel Rating (R-value), distinctness of image (DOI), longwave, shortwave, and dullness (du), of injection-molded articles.

The polyamide compositions disclosed herein provide both structural, e.g., denser feel, and aesthetic properties. In some cases, these compositions can effectively replace conventional ABS and PC/ABS injection-molded articles which have no structural integrity (purely decorative). Additionally, conventional ABS and PC/ABS have low heat absorption temperature (HDT) and cannot tolerate high temperature paint coating, which makes it difficult to apply an aesthetic coating. Beneficially, the polyamide composition has a high HDT and does not form blisters during high temperature paint coating, which provides for additional production options.

The specific combination of the copolymers, e.g., PA-6,6/6 or PA-6,6/6I, or terpolymers, e.g., PA-6,6/6I/6, in the polyamide composition has been shown to enhance the surface appearance of injection-molded articles. It has been found that using the specific polyamides increases the melting point of the polyamide (to within a relatively high range). Beneficially, the higher melting point of the polyamides prevents etch-induced blistering and also reduces scrap rate compared to conventional polyamide compositions. By utilizing the specific polyamides, e.g., copolymers and terpolymers described herein, the processing time and temperature range for injection molding applications has also been beneficially expanded.

The polyamide compositions described herein also produce an injection-molded article that is capable of being strongly bonded to a plating, e.g., chrome-plating. In particular, the polyamide composition employs a surface-treated etchable filler that produces a platable injection-molded article with a significantly higher peel strength contributing to the durability of the molding product while achieving good surface aesthetics. For example, the polyamide composition includes a surface-treated etchable filler that improves the etching properties of the resultant injection-molded articles. The improved etching properties provides high peel strengths between the interface of the surface of the injection-molded article and the metal plating.

It has also been found that providing some additives, optionally in specific quantities, beneficially improves surface appearance, structural properties, and processability of the injection-molded article formed from the polyamide composition. The additives may be, for example, specific pigments, lubricants, and/or processing aids. In some aspects, the polyamide composition comprises from 1 wt. % to 10 wt. % of pigment, from 0.05 wt. % to 1 wt. % of lubricant, and/or from 0.25 wt. % to 2 wt. % of processing aid. The synergistic combinations of performance characteristics are discussed in more detail herein.

Polyamides

The polyamide composition may include a wide variety of polyamides. In some embodiments, the polyamide may comprise PA-6, PA-6,6, PA4,6, PA-6,9, PA-6,10, PA-6,12, PA11, PA12, PA9,10, PA9,12, PA9,13, PA9,14, PA9,15, PA-6,16, PA9,36, PA10,10, PA10,12, PA10,13, PA10,14, PA12,10, PA12,12, PA12,13, PA12,14, PA-6,14, PA-6,13, PA-6,15, PA-6,16, PA-6,13, PAMXD,6, PA4T, PA5T, PA-6T, PA9T, PA10T, PA12T, PA4I, PA5I, PA-6I, PA10I, copolymers, terpolymers, and mixtures thereof.

In some embodiments, the polyamide compositions may comprise one or more polyamides, e.g., a copolymer and/or a terpolymer. It has been found that using copolymers not only enhances the surface appearance of injection-molded articles, but also increases the melting point of the resultant injection-molded article. By utilizing the copolymers in the polyamide composition, the resultant injection-molded article achieves desirable mechanical properties and surface appearance. For example, in some embodiments, the polyamide composition comprises copolymers of PA-6 and PA-6,6. For example, in some embodiments, the polyamide composition comprises copolymers or terpolymers of PA-6, PA-6,6, and/or PA-6I. In some aspects, the polyamide composition includes one or more of PA-6,6/6 and PA-6,6/6I.

In some embodiments, the polyamide composition may comprise a copolymer of PA-6,6/6. In some aspects, the copolymer of PA-6,6/6 comprises PA-6 ranging from 1 wt. % to 20 wt. %, e.g., from 2 wt. % to 18 wt. %, from 4 wt. % to 16 wt. %, from 5 wt. % to 12 wt. %, or from 6 wt. % to 10 wt. %, based on the total weight of the copolymer. In terms of upper limits, the copolymer of PA-6,6/6 comprises PA-6 in an amount less than 20 wt. %, e.g., less than 18 wt. %, less than 16 wt. %, less than 14 wt. %, less than 12 wt. %, or less than 10 wt. %. In terms of upper limits, the copolymer of PA-6,6/6 comprises PA-6 in an amount greater than 1 wt. %, e.g., greater than 2 wt. %, greater than 3 wt. %, greater than 4 wt. %, greater than 6 wt. %, greater than 7 wt. %, or greater than 8 wt. %. The remaining balance of the copolymer may comprise PA-6,6.

In some embodiments, the polyamide composition may comprise a copolymer of PA-6,6/6I. In some embodiments, the copolymer of PA-6,6/6I comprises PA-6I in an amount ranging from 1 wt. % to 20 wt. %, e.g., from 4 wt. % to 19 wt. %, from 6 wt. % to 18 wt. %, from 10 wt. % to 17 wt. %, from 12 wt. % to 16 wt. %, or from 14 wt. % to 16 wt. %, based on the total weight of the copolymer. In terms of upper limits, the copolymer of PA-6,6/6I comprises PA-6I in an amount less than 20 wt. %, e.g., less than 19 wt. %, less than 18 wt. %, less than 17 wt. %, less than 16 wt. %, or less than 15 wt. %. In terms of lower limits, the copolymer of PA-6,6/6I comprises PA-6I in an amount greater than 1 wt. %, e.g., greater than 2 wt. %, greater than 4 wt. %, greater than 6 wt. %, greater than 8 wt. %, greater than 10 wt. %, or greater than 12 wt. %. The remaining balance of the copolymer may comprise PA-6,6.

In some aspects, the polyamide composition may comprise a terpolymer comprising PA-6,6. In some embodiments, the terpolymer may comprise PA-6,6 in an amount ranging from 60 wt. % to 98 wt. %, e.g., from 65 wt. % to 96 wt. %, from 70 wt. % to 90 wt. %, from 75 wt. % to 85 wt. %, or from 80 wt. % to 85 wt. %, based on the total weight of the terpolymer. In terms of upper limits, the terpolymer may comprise PA-6,6 in an amount less than 98 wt. %, e.g., less than 96 wt. %, less than 94 wt. %, less than 92 wt. %, less than 90 wt. %, or less than 85 wt. %. In terms of lower limits, the terpolymer may comprise PA-6,6 in an amount greater than 60 wt. % PA-6,6, e.g., greater than 65 wt. %, greater than 70 wt. %, greater than 75 wt. %, greater than 80 wt. %, or greater than 84 wt. %.

In some embodiments, the polyamide composition may comprise a terpolymer comprising PA-6I. In some embodiments, the terpolymer may comprise PA-6I in an amount ranging from 2 wt. % to 20 wt. %, e.g., from 4 wt. % to 18 wt. %, from 5 wt. % to 16 wt. %, from 6 wt. % to 14 wt. %, or from 8 wt. % to 12 wt. %, based on the total weight of the terpolymer. In terms of upper limits, the terpolymer may comprise PA-6I in an amount less than 20 wt. %, e.g., less than 18 wt. %, less than 16 wt. %, less than 14 wt. %, less than 12 wt. %, or less than 10 wt. %. In terms of lower limits, the terpolymer may comprise PA-6I in an amount greater than 2 wt. %, e.g., greater than 3 wt. %, greater than 4 wt. %, greater than 5 wt. %, greater than 6 wt. %, greater than 7 wt. %, or greater than 8 wt. %.

In some embodiments, the polyamide composition may comprise a terpolymer comprising PA-6. In some embodiments, the terpolymer may comprise PA-6 in an amount ranging from 1 wt. % to 15 wt. %, e.g., from 2 wt. % to 12 wt. %, from 3 wt. % to 10 wt. %, from 4 wt. % to 8 wt. %, or from 5 wt. % to 7 wt. %, based on the total weight of the terpolymer. In terms of upper limits, the terpolymer may comprise PA-6 in an amount less than 15 wt. %, e.g., less than 14 wt. %, less than 12 wt. %, less than 10 wt. %, less than 8 wt. %, or less than 7 wt. %. In terms of lower limits, the terpolymer may comprise PA-6 in an amount greater than 1 wt. %, e.g., greater than 2 wt. %, greater than 3 wt. %, greater than 4 wt. %, greater than 5 wt. %, or greater than 6 wt. %.

In some embodiments, the polyamide composition may comprise a terpolymer of PA-6,6/6I/6. In some aspects, the terpolymer of PA-6,6/6I/6 comprises from 60 wt. % to 98 wt. % of PA-6,6, from 2 wt. % to 20 wt. % of PA-6I, and from 1 wt. % to 15 wt. % of PA-6. In some aspects, the terpolymer of PA-6,6/6I/6 comprises from 1 wt. % to 20 wt. % PA-6, e.g., from 2 wt. % to 18 wt. %, from 4 wt. % to 16 wt. %, from 5 wt. % to 12 wt. %, or from 6 wt. % to 10 wt. %. In some aspects, the terpolymer of PA-6,6/6I/6 includes less than less than 14 wt. % PA-6, less than 12 wt. %, less than 10 wt. %, less than 8 wt. %, or less than 7 wt. %. In some aspects, the terpolymer of PA-6,6/6I/6 includes greater than 1 wt. % PA-6, e.g., greater than 2 wt. %, greater than 3 wt. %, greater than 4 wt. %, greater than 5 wt. %, or greater than 6 wt. %.

In some aspects, the polyamide composition may comprise polyamides produced through ring-opening polymerization or polycondensation, including the copolymerization and/or copolycondensation, of lactams. Without being bound by theory, these polyamides may include, for example, those produced from propriolactam, butyrolactam, valerolactam, and caprolactam. For example, in some embodiments, the polyamide is a polymer derived from the polymerization of caprolactam. Furthermore, the polyamide composition may comprise the polyamides produced through the copolymerization of a lactam with a nylon, for example, the product of the copolymerization of a caprolactam with PA-6,6.

In some embodiments, the polyamides can be condensation products of one or more dicarboxylic acids, one or more diamines, one or more aminocarboxylic acids, and/or ring-opening polymerization products of one or more cyclic lactams, e.g., caprolactam and laurolactam. In some aspects, the polyamides may include aliphatic, aromatic, and/or semi-aromatic polyamides and can be homopolymer, copolymer, terpolymer or higher order polymers. In some aspects, the polyamides includes blends of two or more polyamides. In some embodiments, the polyamide comprises aliphatic or aromatic polyamides or blends of two or more polyamides.

In some aspects, the dicarboxylic acids may comprise one or more of adipic acid, azelaic acid, terephthalic acid, isophthalic acid, sebacic acid, and dodecanedioic acid. In some aspects, the dicarboxylic acids may comprise adipic, isophthalic and terephthalic acid. In some aspects, the dicarboxylic acids may comprise an aminocarboxylic acid, e.g., 11-aminododecanoic acid.

In some aspects, the diamines may comprise one or more of tetramethylenediamine, hexamethylenediamine, octamethylenediamine, nonamethylenediamine, 2-methylpentamethylenediamine, 2-methyloctamethylenediamine, trimethylhexamethylenediamine, bis(p-aminocyclohexyl)methane, m-xylylenediamine, p-xylylenediamine, decamethylenediamine, undecamethylenediamine, dodecamethylenediamine, tridecamethylenediamine, tetramethylenediamine, pentamethylenediamine, hexamethylenediamine, and the like. Other examples of the aromatic diamine components, which are merely illustrative, include benzene diamines such as 1,4-diaminobenzene, 1,3-diaminobenzene, and 1,2-diaminobenzene; diphenyl(thio)ether diamines such as 4,4'-diaminodiphenylether, 3,4'-diaminodiphenylether, 3,3'-diaminodiphenylether, and 4,4'-diaminodiphenylthioether; benzophenone diamines such as 3,3'-diaminobenzophenone and 4,4'-diaminobenzophenone; diphenylphosphine diamines such as 3,3'-diaminodiphenylphosphine and 4,4'-diaminodiphenylphosphine; diphenylalkylene diamines such as 3,3'-diaminodiphenylmethane, 4,4'-diaminodiphenylmethane, 3,3'-diaminodiphenylpropane, and 4,4'-diaminodiphenylpropane; diphenyl sulfide diamines such as 3,3'-diaminodiphenylsulfide and 4,4'-diaminodiphenylsulfide; diphenylsulfone diamines such as 3,3'-diaminodiphenylsulfone and 4,4'-diaminodiphenylsulfone; and benzidines such as benzidine and 3,3'-dimethylbenzidine.

In some embodiments, the polyamides may comprise semi-aromatic polyamides. In some aspects, the semi-aromatic polyamides may comprise polyisophthalamides, polyterethalamides, or PA-MXD,6. In some aspects, the polyterethalamides comprise PA-12,T, PA-10,T, PA-9,T, PA-6,T/6,6, PA-6,T/D,T, copolymers, terpolymers, or mixtures thereof. In some aspects, the semi-aromatic polyamides may comprise hexamethylene isophthalamide (PA-6T/6I), hexamethylene adipamide (PA-6I/6,6), hexamethylene adipamide/hexamethylene terephthalamide/hexamethylene isophthalamide copolyamide (PA-6,6/6,T/6,I); poly(caprolactam-hexamethylene terephthalamide) (PA-6/6,T); and copolymers, terpolymers, and mixtures of these polymers.

In some embodiments, the polyamides may comprise aliphatic polyamides. In some embodiments, the polyamide comprises aliphatic polyamide copolymers and terpolymers comprising PA-6,6/6; PA-6,6/68; PA-6,6/610; PA-6,6/612; PA-6,6/10; PA-6,6/12; PA-6/68; PA-6/610; PA-6/612; PA-6/10; PA-6/12; PA-6/6,6/610; PA-6/6,6/69; PA-6/6,6/11; PA-6/6,6/12; PA-6/610/11; PA-6/610/12; and PA-6/6,6/PACM (bis-p-{aminocyclohexyl} methane).

In some aspects, the polyamide comprises physical blends of aliphatic polyamides, semiaromatic polyamides, and/or aromatic polyamides to obtain properties intermediate between or synergistic of the properties of each polyamide.

Etchable Filler

The polyamide composition may further include an etchable filler, e.g., an etchable particulate filler. In some embodiments, the etchable filler can be partially removed and/or altered by treatment (acid, base, thermal, solvent, etc.), (to accomplish the etching) under conditions which do not deleteriously affect the polymer composition. In some embodiments, the etchable filler is a material such as magnesium hydroxide, calcium carbonate or zinc oxide which can be removed, e.g., etched, by an aqueous acidic solution. Since the polymeric matrix will normally not be greatly affected by the treatment, only the etchable filler near the surface of the injection-molded article will be affected e.g., fully or partially removed.

The etchable filler is capable of being etched or removed by a surface preparation process for metallization, thereby creating surface roughness which can improve adhesion of the resultant injection-molded article to a metal plating. The etchable fillers, e.g., acid-etchable, can be any filler which can be removed by the surface preparation process. The fillers can be used alone or in combination with other fillers. In some embodiments, the etchable filler is magnesium hydroxide or calcium carbonate. It has been found that surface-treated magnesium hydroxide provides higher peel strength for the resultant injection-molded article.

In some aspects, the etchable filler can be etched with an etching solution. The pH of the etching solution used to treat the polymeric article surface can be an important aspect of treatment, as can treating temperature, agitation and time. In some aspects, the etching solution can be an aqueous acidic liquid mixture having a pH of less than 7, e.g., less than 6, less than 5, less than 4, less than 3, or less than 2. In some embodiments, the etching solution can be an aqueous acidic liquid mixture having a pH from 1-7, e.g., from 2-6, from 3-6, from 4-6, from 5-6, or from 2-5. Acidity can be established by the use of acids such as inorganic and organic acids. Non-limiting examples of inorganic acids include hydrochloric acid, sulfuric acid, nitric acid, and hydrofluoric acid. Non-limiting examples of organic acids include oxalic acid, acetic acid, benzoic acid, or the like. Buffers can also be used, established by the presence of one or more of bicarbonate, bifluoride, bisulphate, or similar compounds, with one or more of carbonic acid, carbonate, hydrofluoric acid, fluoride, sulfuric acid, sulfate, or similar compounds.

In some embodiments, the polyamide composition comprises etchable fillers in an amount ranging from 2 wt. % to 40 wt. %, e.g., from 2.5 wt. % to 38 wt. %, from 3 wt. % to 36 wt. %, from 4 wt. % to 32 wt. %, from 6 wt. % to 28 wt. %, from 8 wt. % to 24 wt. %, from 10 wt. % to 20 wt. %, from 12 wt. % to 18 wt. %, or from 14 wt. % to 16 wt. %, based on the total weight of the polyamide composition. In terms of upper limits, the polyamide composition includes less than 40 wt. % of etchable fillers, e.g., less than 38 wt.

%, less than 34 wt. %, less than 30 wt. %, less than 26 wt. %, less than 22 wt. %, less than 18 wt. %, or less than 16 wt. %. In terms of lower limits, the polyamide composition includes greater than 2 wt. % of etchable fillers, e.g., greater than 2.5 wt. %, greater than 3 wt. %, greater than 4 wt. %, greater than 6 wt. %, greater than 8 wt. %, greater than 10 wt. %, greater than 12 wt. %, greater than 14 wt. %, or greater than 15 wt. %.

Conventionally, polyamide compositions for injection-molded articles use at least 25 wt. % of etchable fillers in the polyamide composition to achieve desired plating properties. It has been found that using less than 25 wt. % etchable fillers in the polyamide composition provides improved peel properties, e.g., peel strength, for metal plating applications. In other words, the present polyamide compositions were able to achieve desired plating properties at lower loadings of etchable fillers. In some aspects, the polyamide composition includes less than 25 wt. % etchable fillers, e.g., less than 24 wt. %, less than 22 wt. %, less than 20 wt. %, less than 18 wt. %, or less than 16 wt. %. In some aspects, the polyamide composition includes about 15 wt. % of etchable fillers.

In some embodiments, the etchable fillers have an average particle size ranging from 0.1 microns to 2.0 microns, e.g., from 0.2 microns to 1.9 microns, from 0.3 microns to 1.8 microns, from 0.4 microns to 1.6 microns, from 0.5 microns to 1.4 microns, from 0.6 microns to 1.2 microns, or from 0.8 microns to 1.1 microns. In terms of upper limits, the etchable fillers have an average particle size less than 2.0 microns, e.g., less than 1.8 microns, less than 1.7 microns, less than 1.6 microns, less than 1.5 microns, less than 1.4 microns, less than 1.2 microns, or less than 1 microns. In terms of upper limits, the etchable fillers have an average particle size greater than 0.1 microns, e.g., greater than 0.2 microns, greater than 0.3 microns, greater than 0.4 microns, greater than 0.5 microns, greater than 0.6 microns, greater than 0.7 microns, or greater than 0.8 microns.

In some embodiments, the etchable fillers have a $d_{90}$ ranging from 1.4 microns to 1.9 microns, e.g., from 1.5 microns to 1.8 microns or from 1.6 microns to 1.7 microns. In some embodiments, the etchable fillers have a $d_{50}$ ranging from 0.8 microns to 1.1 microns, e.g., from 0.85 microns to 1.05 microns or from 0.9 microns to 1 micron. In some embodiments, the etchable fillers have a $d_{10}$ ranging from 0.3 microns to 0.6 microns, e.g., from 0.35 microns to 0.55 microns or from 0.4 microns to 0.5 microns. In this regard, $d_{20}$, $d_{50}$ and $d_{90}$ are based on a volume distribution as measured by laser diffraction, e.g., using a laser diffraction software package ($d_{50}$ is a median particle size value).

In some embodiments, the average particle dimensions of the etchable fillers can have a generally single peaked distribution. For example, all particles could have the same average particle dimension or, as another example, the particles could have a distribution of average particle dimensions, such as a Gaussian distribution, so that the average particle dimensions range above and below some mean value.

In some embodiments, the average particle dimension the etchable fillers may have a multimodal distribution. For example, the average particles dimensions may have a bimodal distribution or higher modal distributions, e.g., trimodal. A multimodal distribution of particle dimensions could be useful to, for example, tailor the properties of the polyamide composition. In addition to distributions of size, other particle features, such as, for example, particle shape and particle composition, may be distributed about a single mean or may have a multimodal distribution. These other distributions of particle features may also be used to tailor one or more properties of the injection-molded article.

In some aspects, the distribution of particle diameters for the etchable fillers may have a first maximum ranging from 1.4 microns to 1.9 microns and a second maximum ranging from 2.4 microns to 4.4 microns. In some aspects, the distribution of particle diameters may have a first maximum ranging from 0.8 microns to 1.1 microns and a second maximum ranging from 1.5 microns to 2 microns. In some aspects, the distribution of particle diameters may have a first maximum ranging from 0.3 microns to 0.6 and a second maximum ranging from 0.7 microns to 1.1 microns. In some aspects, the bimodal distribution of particle diameters may be any one of these combination of ranges.

In some embodiments, the etchable fillers have a surface area ranging from 6 $m^2/g$ to 12 $m^2/g$, e.g., from 7 $m^2/g$ to 11.5 $m^2/g$, from 8 $m^2/g$ to 11 $m^2/g$, or from 9 $m^2/g$ to 10 $m^2/g$. terms of upper limits, the etchable fillers have a surface area less than 12 $m^2/g$, e.g., less than 11.5 $m^2/g$, less than 11 $m^2/g$, less than 10.5 $m^2/g$, or less than 10 $m^2/g$. In terms of lower limits, the etchable fillers have a surface area greater than 6 $m^2/g$, e.g., greater than 6.5 $m^2/g$, greater than 7 $m^2/g$, greater than 7.5 $m^2/g$, or greater than 8 $m^2/g$.

In some embodiments, the etchable fillers comprise metal salts and minerals such as: (a) metal carbonates, wherein the metal comprises one or more of barium, bismuth, cadmium, calcium, cobalt, copper, lead, magnesium, iron, nickel and zinc; (b) metal oxides, wherein the metal comprises one or more of aluminum, antimony, bismuth, cadmium, cerium, cobalt, copper, gallium, germanium, indium, iron, lead, manganese, nickel, tin, zinc and zirconium; (c) metal hydroxides, wherein the metal comprises one or more of bismuth, cerium, cobalt, copper, magnesium and manganese; (d) metal oxalates, wherein the metal comprises one or more of aluminum, calcium, cobalt, iron, lead, magnesium, manganese, nickel and tin; (e) metal orthophosphates, wherein the metal comprises one or more of aluminum, cadmium, cerium, chromium, cobalt, lead, lithium, magnesium, nickel, strontium, tin and zinc; (f) metal metasilicates, wherein the metal comprises one or more of barium, calcium, lead and lithium; and (g) metal pyrophosphates, wherein the metal comprises one or more of magnesium, manganese and nickel.

Furthermore, these etchable fillers can be treated with a compound to modify the properties of the etchable filler. Beneficially, the treated, e.g., surface-treated, etchable fillers, employed in the polyamide composition can make the composition more compatible with polyamides, e.g., nylon. In other aspects, the treated etchable fillers can also provide a compatible surface for etching. For example, the etchable fillers can be coat-treated with coupling agents. In some embodiments, a treated etchable filler can be provided in the polyamide composition. In some embodiments, the etchable filler can be extruded with a coupling agent to form a treated etchable filler.

In some aspects, the etchable filler is coat-treated with a silane coupling agent. The silane coupling agent may comprise vinylsilanes such as vinyltris(β-methoxyethoxy)silane, vinylethoxysilane and vinyltrimethoxysilane, (meth)acrylsilanes such as γ-methacryloxypropyltrimethoxysilane, epoxy silanes such as β-(3,4-epoxy-cyclohexyl)ethyltrimethoxysilane, β-(3,4-epoxy-cyclohexyl)methyltrimethoxysilane, β-(3,4-epoxy-cyclohexyl)ethyltriethoxysilane, γ-glycidoxypropyltrimethoxysilane and γ-glycidoxypropyltriethoxysilane, aminosilanes such as N-β-(aminoethyl)-γ-aminopropyltriethoxysilane, N-β-(aminoethyl)-γ-aminopropyltrimethoxysilane, N-β(aminoethyl)-γ- aminopropylmethyldiethoxysilane, γ-aminopropyltriethoxysilane, γ-aminopropyltrimethoxysilane, N-phenyl-γ-aminopropyltrimethoxysilane and N-phenyl-γ-aminopropyltriethoxysilan, and thiosilanes such as γ-mercaptopropyltrimethoxysilane and γ-mercaptopropyltriethoxysilane. In some aspects, the etchable filler is coat-treated with a vinylsilane coupling agent. In some aspects, the etchable filler is surface treated with an aminosilane coupling agent.

It has been found that utilizing an etchable filler comprising magnesium hydroxide coat-treated with a silane coupling agent improves thermal properties and peel strength of the injection-molded article formed from the polyamide composition. In some embodiments, the silane coupling agent comprises one or more of fatty acids, alkylsilanes, organic litanates, organic zirconates, aminosilanes, vinylsilanes, or siloxane derivatives. In some aspects, a vinylsilane coating on the etchable filler provides a polymer composition having a high peel strength.

In some embodiments, the etchable filler, e.g., magnesium hydroxide, includes a silane coupling agent ranging from 0.05 wt. % to 5.0 wt. %, e.g., from 0.08 wt. % to 4.5 wt. %, from 0.1 wt. % to 4.0 wt. %, from 0.5 wt. % to 3.5 wt. %, from 1 wt. % to 3 wt. %, or from 1.5 wt. % to 2.5 wt. %, based on the total weight of the etchable filler. In terms of upper limits, the etchable filler includes less than 5.0 wt. % silane coupling agent, e.g., less than 4.0 wt. %, less than 4.0 wt. %, less than 3.5 wt. %, or less than 3.0 wt. %, or less than 2.0 wt. %. In terms of lower limits, the etchable filler includes greater than 0.05 wt. % silane coupling agent, e.g., greater than 0.08 wt. %, greater than 0.1 wt. %, greater than 0.5 wt. %, or greater than 1 wt. %.

In some embodiments, the etchable filler can treated with other compounds in order to modify properties of the polyamide composition. In some aspects, the etchable filler is treated with a coupling agent such as an isocyanate compound, an organic silane compound, an organic titanate compound, an organic borane compound or an epoxy compound; a plasticizing agent such as a polyalkylene oxide oligomer compound, a thioether compound, an ester compound or an organic phosphorus compound; a crystal nucleus agent such as talc, kaoline, an organic phosphorus compound or polyether ether ketone; metal soap such as montanic wax, lithium stearate or aluminum stearate; a releasing agent such as ethylene diamine/strearic acid/sebacic acid polycondensate or a silicone compound; a color protection agent such as hypophosphite; and other general addition agents such as a lubricant, an ultraviolet light protection agent, a coloring agent, a flame retardant and a foaming agent.

Semi-Structural Mineral

The polyamide composition may optionally include one or more semi-structural mineral fillers, e.g., semi-structural minerals. The polyamide composition may include any semi-structural mineral having various average diameters, cross sections, lengths, and aspect ratios. In some aspects, the semi-structural mineral can include ingredients such as glass, carbon, graphite, polymer, and the like. In some embodiments, the semi-structural mineral comprises kaolin particles. The weight percentage of the semi-structural mineral used in the polyamide composition can range from 10 wt. % to 40 wt. %, based on the total weight percent of the polyamide composition.

In some embodiments, the polyamide composition may include semi-structural mineral in an amount ranging from 10 wt. % to 40 wt. %, e.g., from 12 wt. % to 38 wt. %, from 14 wt. % to 36 wt. %, from 16 wt. % to 32 wt. %, from 18 wt. % to 30 wt. %, from 20 wt. % to 28 wt. %, from 22 wt. % to 26, or from 24 wt. % to 28 wt. %. In terms of upper limits, the polyamide composition includes less than 40 wt. % of semi-structural mineral, e.g., less than 36 wt. %, less than 34 wt. %, less than 32 wt. %, less than 30 wt. %, less than 28 wt. %, or less than 25 wt. %. In terms of lower limits, the polyamide composition includes greater than 10 wt. % of semi-structural mineral, e.g., greater than 12 wt. %, greater than 14 wt. %, greater than 18 wt. %, greater than 20 wt. %, or greater than 22 wt. %.

In some aspects, the semi-structural mineral may comprise one or more of talc, silicates, quartz, kaolin, calcined kaolin, hydrous kaolin, silicic acids, magnesium carbonate, chalk, ground or cut calcium carbonate, lime, feldspar, inorganic pigments, such as barium sulphate, zinc oxide, zinc sulphide, titanium dioxide, ferric oxide, ferric manganese oxide, metal oxides, especially spinels, such as for example copper ferric spinel, copper chromium oxide, zinc ferric oxide, cobalt-chromium oxide, cobalt-aluminium oxide, magnesium aluminium oxide, copper-chromium-manganese-compound oxide, copper-manganese-iron-compound oxide, rutile pigments such as titanium-zinc-rutile, nickel-antimony-titanate, permanent magnetic or magnetisable metals or alloys, concave silicate filler material, aluminium oxide, boron nitride, boron carbide, aluminium nitride, calcium fluoride, and compounds thereof. In some aspects, the semi-structural mineral can be one or more of kaolin or talc. In some aspects, the semi-structural mineral can be surface treated as described herein. In some embodiments, the semi-structural mineral may not include any mica or wollastonite.

In some aspects, the semi-structural mineral used in the polyamide composition can be hydrated, such as hydrous kaolin or hydrous clay, such that a vapor is released during the compounding and molding process that can be used to form porosity within the polyamide. In some aspects, water chemically bound to a semi-structural mineral can be released when the composite is subject to excessive heat and can also act as a fire retardant. In some aspects, the polyamide composition includes calcite kaolin, treated kaolin, or mixtures thereof. In some aspects, the kaolin is a surface-treated kaolin, e.g., commercially available Polarite 102A from Imerys, which is a calcined and silane-treated kaolin. In some aspects, the semi-structural mineral comprises a calcined and surface-treated alumino-silicate, e.g., $Al_2Si_2O_5(OH)_4$.

In some embodiments, the polyamide composition may include one or more commercially available semi-structural minerals, e.g., commercially available kaolin. The commercially available semi-structural minerals may include Hydrite® SB 100s from Imerys Kaolin, Polarite 102A, Polarite 502A, Polarite 702A, or Polarite 902A from Imerys Kaolin, and/or Translink® 445 or Translink® 555 from BASF. In some aspects, the commercially available semi-structural minerals may be spray dried and/or pulverized, e.g., spray dried Polarite 702A. In some aspects, the commercially available semi-structural minerals may be mixed with any of the aforementioned semi-structural minerals. In some embodiments, the polyamide composition may include a semi-structural mineral system comprising one or more semi-structural minerals. For example, the semi-structural mineral system may comprise Translink® 555 in combination with Hydrite® SB 100s. In some embodiments, the semi-structural mineral system may comprise a nucleating agent. In some embodiments, semi-structural mineral system may comprise magnesium oxide ($MgO_2$) in combination with one or more semi-structural minerals. In some embodiments where the magnesium oxide is present, the semi-structural mineral system comprises magnesium oxide in an amount ranging from 0.05 wt. % to 5 wt. %, e.g., from 0.08 wt. % to 4 wt. %, from 0.1 wt. % to 3 wt. %, from 0.5 wt. % to 2 wt. %, from 0.8 wt. % to 1.5 wt. %, or from 1 wt. % to 1.2 wt. %, based on the total weight of the semi-structural mineral system.

Glass Fibers

The polyamide composition may optionally include glass fibers, if so, preferably in small amounts. In some embodiments, the polyamide composition includes little or no glass fibers. In some embodiments, the polyamide composition comprises glass fibers in an amount less than 15 wt. % based on the total weight of the polyamide composition.

In some embodiments wherein the glass fibers are present, the polyamide composition comprises glass fibers in an amount ranging from 0.05 wt. % to 15 wt. %, e.g., from 0.1 wt. % to 12 wt. %, from 0.2 wt. % to 10 wt. %, from 0.3 wt. % to 8 wt. %, from 0.5 wt. % to 7 wt. %, or from 0.5 wt. % to 15 wt. %, based on the total weight of the polyamide composition. In terms of upper limits, the polyamide composition comprises less than 15 wt. % of glass fibers, e.g., less than 12 wt. %, less than 10 wt. %, less than 8 wt. %, less than 5 wt. %, less than 3 wt. %, or less than 1 wt. %. In terms of lower limits, the polyamide composition comprises greater than 0.05 wt. % of glass fibers, e.g., greater than 0.1 wt. %, greater than 0.2 wt. %, greater than 0.3 wt. %, greater than 0.5 wt. %, or greater than 1 wt. %.

In some embodiments, the glass fibers, if present, may have an average diameter ranging from 1 microns to 20 microns, e.g., from 2 microns to 18 microns, from 3 microns to 16 microns, from 4 microns to 12 microns, from 5 microns to 10 microns, from 6 microns to 8 microns, from 4 microns to 6 microns, or from 5 microns to 7 microns. In terms of upper limits, the polyamide composition includes glass fibers having an average diameter less than 20 microns, e.g., less than 18 microns, less than 16 microns, less than 14 microns, less than 12 microns, less than 10 microns, or less than 8 microns. In terms of lower limits, the polyamide composition includes glass fibers having an average diameter greater than 1 microns, e.g., greater than 2 microns, greater than 3 microns, greater than 4 microns, greater than 5 microns, or greater than 6 microns. In some aspects, at least 70% of the glass fibers have diameter ranging from 1 microns to 20 microns, e.g., at least 75%, at least 80%, at least 85%, at least 90%, at least 95%, or at least 99%.

In some embodiments, the polyamide composition may include (small amounts of) short glass fibers having a pre-compounding length ranging from 3 mm to 5 mm and an average diameter ranging from 1 micron to 20 microns. After compounding, the glass fibers may have a length ranging from 0.1 mm to 1 mm. In some aspects, the short glass fibers have a circular and/or noncircular cross section.

The glass fibers, if present, may comprise a mixture of one or more glass fibers. The glass fibers can be chopped into lengths or "continuous" and have various diameters, cross sections, lengths, and aspect ratios. In some aspects, the glass fibers may comprise ingredients such as glass, carbon, graphite, graphene, and polymer. In some aspects, the glass fibers are short chopped glass fibers with a circular cross section. In some aspects, mixtures of glass fibers with circular and noncircular cross sections can also be used to strengthen the injection-molded articles. In some aspects, the glass fibers, independent of the shape of the cross-sectional surface and length of the fibers, may comprise one or more of A glass fibers, C glass fibers, D glass fibers, M glass fibers, S glass fibers, and/or R glass fibers, and E glass fibers.

Additives

In some embodiments, the polymer composition can optionally include one or more additive(s). In some embodiments, the additives comprise one or more of catalyst, polymers other than polyamide, adhesion promoters, ions, compounds, preservatives such as heat stabilizers and anti-oxidants, lubricants, flow enhancers, or other ingredients as known in the art. The additive(s) may include at least one of: inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, fibrous materials and particulate fillers.

In some embodiments, the polyamide composition includes a nucleating agent. It was surprisingly found that using a nucleating agent in combination with the semi-structural minerals described herein improved the physical properties of the resulting injection-molded polyamide. For example, a polyamide composition including a nucleating agent from 0.001 wt. % to 0.5 wt. % can improve the tensile strength of the resulting injection-molded polyamide.

In some embodiments, the polyamide composition may include one or more optional additive(s) in an amount ranging from 0.1 wt. % to 13 wt. %, e.g., from 0.5 wt. % to 12 wt. %, from 0.8 wt. % to 10 wt. %, from 1 wt. % to 9 wt. %, from 2 wt. % to 8 wt. %, from 3 wt. % to 7 wt. %, or from 4 wt. % to 6 wt. %, based on the total weight of the polyamide composition. In terms of upper limits, the polyamide composition includes less than 13 wt. % of additive(s), e.g., less than 12 wt. %, less than 11 wt. %, less than 10 wt. %, less than 9 wt. %, less than 8 wt. %, less than 6 wt. %, less than 4 wt. %, or less than 2 wt. %. In terms of lower limits, the polyamide composition includes greater than 0.1 wt. % of additive(s), e.g., greater than 0.1 wt. %, greater than 0.2 wt. %, greater than 0.4 wt. %, greater than 0.6 wt. %, greater than 0.8 wt. %, greater than 1 wt. %, or greater than 1.5 wt. %.

In some embodiments, the additives comprise at least pigment. In some aspects, the pigment may be nigrosine. In some embodiments, the polyamide composition includes pigment in an amount ranging from 1 wt. % to 10 wt. %, e.g., from 2 wt. % to 9 wt. %, from 3 wt. % to 8 wt. %, from 4 wt. % to 7 wt. %, or from 5 wt. % to 6 wt. %, based on the total weight of the polyamide composition. In terms of upper limits, the polyamide composition includes less than 10 wt. % pigment e.g., less than 9 wt. %, less than 8 wt. %, less than 7 wt. %, less than 6 wt. %, or less than 5 wt. %. In terms of lower limits, the polyamide composition includes greater than 1 wt. % pigment e.g., greater than 1.5 wt. %, greater than 2 wt. %, greater than 2.5 wt. %, greater than 3 wt. %, greater than 4 wt. %, or greater than 4.5 wt. %.

In some embodiments, the additives comprise at least lubricant. In some aspects, the lubricant may be zinc stearate. In some embodiments, the polyamide composition includes lubricant in an amount ranging from 0.05 wt. % to 1 wt. %, e.g., from 0.06 wt. % to 0.8 wt. %, from 0.08 wt. % to 0.6 wt. %, from 0.1 wt. % to 0.4 wt. %, or from 0.2 wt. % to 0.3 wt. %, based on the total weight of the polyamide composition. In terms of upper limits, the polyamide composition includes less than 1 wt. %, lubricant e.g., less than 0.8 wt. %, less than 0.6 wt. %, less than 0.4 wt. %, less than 0.3 wt. %, less than 0.2 wt. %, or less than 0.15 wt. %. In terms of lower limits, the polyamide composition includes greater than 0.05 wt. % lubricant, e.g., greater than 0.06 wt. %, greater than 0.07 wt. %, greater than 0.08 wt. %, greater than 0.09 wt. %, greater than 0.1 wt. %, or greater than 0.125 wt. %.

In some embodiments, the additives comprise at least one processing aid. In some embodiments, the polyamide composition includes processing aid in an amount ranging from 0.25 wt. % to 2 wt. %, e.g., from 0.3 wt. % to 1.8 wt. %, from 0.4 wt. % to 1.6 wt. %, from 0.8 wt. % to 1.4 wt. %, or from 1.0 wt. % to 1.2 wt. %, based on the total weight of the polyamide composition. In terms of upper limits, the polyamide composition includes less than 2 wt. % processing aid, e.g., less than 1.8 wt. %, less than 1.6 wt. %, less than 1.4 wt. %, less than 1.2 wt. %, less than 1.1 wt. %, or less than 1 wt. %. In terms of lower limits, the polyamide composition includes greater than 0.25 wt. % processing aid, e.g., greater than 0.3 wt. %, greater than 0.4 wt. %, greater than 0.4 wt. %, greater than 0.6 wt. %, greater than 0.7 wt. %, or greater than 0.8 wt. %. In some aspects, the processing aid may comprise NYLOSTAB S-EED. NYLOSTAB S-EED provides stability of compound melt processing and melt pressure during polymerization. NYLOSTAB S-EED also improves the surface appearance of injection molded parts, including but not limited to narrow part areas or in areas of sharp angles, such as reduction of blush in the molded part gate area.

In some embodiments, the additive in the polyamide composition comprises from 1 wt. % to 10 wt. % of pigment, from 0.05 wt. % to 1 wt. % of lubricant, and/or from 0.25 wt. % to 2 wt. % of processing aid. In some aspects, the pigment comprises a thermally stable nigrosine. In some aspects, the lubricant comprises zinc stearate. In some aspects, the processing aid comprises a substituted piperidine compound, e.g., NYLOSTAB S-EED®.

In some embodiments, the additive may further include a cross-linking agent, e.g., triaminononane. In some aspects, the cross linking agents are co-monomers used in copolymer preparation, e.g., TAN, triaminononane (PA-6,6/6,I/TAN (84.5%/15%/0.5%) with 2.7-3.1 microequivalents per gram of acetic acid end-capping agent). In some aspects, the cross-linking agent is added during polymerization of the polyamide composition.

Properties of the Polyamide Compositions

As mentioned above, the polyamide compositions described herein beneficially impart both aesthetic and some structural properties to resulting injection-molded articles. The specific combination of components in the polyamide compositions synergistically improve the structural properties, e.g., melting point, density, tensile strength, tensile modulus, flex strength, flex modulus, elongation, and HDT, while also improving the surface finish, e.g., DOI, R-value, and long wave, of resulting injection-molded articles compared to conventional aesthetic compositions, e.g., ABS or PC/ABS.

In some embodiments, the polyamide compositions may have a melting point greater than 200° C., e.g., greater than 210° C., greater than 220° C., greater than 230° C., greater than 240° C., or greater than 250° C. In some embodiments, the polyamides may have a melting point less than 300° C., e.g., less than 290° C., less than 280° C., less than 275° C., less than 270° C., or less than 260° C. In some embodiments, the polyamides may have a melting point ranging from 200° C. to 300° C., e.g., from 210° C. to 290° C., from 220° C. to 280° C., from 230° C. to 270° C., from 240° C. to 260° C., or from 245° C. to 255° C.

In some embodiments, the polyamide compositions may have a density ranging from 1.1 g/cm$^3$ to 1.6 g/cm$^3$, e.g., from 1.15 g/cm$^3$ to 1.55 g/cm$^3$, from 1.2 g/cm$^3$ to 1.5 g/cm$^3$, from 1.25 g/cm$^3$ to 1.45 g/cm$^3$, from 1.3 g/cm$^3$ to 1.4 g/cm$^3$, from 1.35 g/cm$^3$ to 1.45 g/cm$^3$, or from 1.4 g/cm$^3$ to 1.5 g/cm$^3$. In some embodiments, the polyamide compositions may have a density less than 1.6 g/cm$^3$, e.g., less than 1.55 g/cm$^3$, less than 1.5 g/cm$^3$, less than 1.45 g/cm$^3$, less than 1.4 g/cm$^3$, or less than 1.35 g/cm$^3$. In some embodiments, the polyamide compositions may have a density greater than 1.1 g/cm$^3$, e.g., greater than 1.15 g/cm$^3$, greater than 1.2 g/cm$^3$, greater than 1.25 g/cm$^3$, or greater than 1.3 g/cm$^3$.

In some embodiments, the polyamide compositions may have a heat distortion temperature (HDT) ranging from 75° C. to 125° C., e.g., from 80° C. to 120° C., from 85° C. to 115° C., from 90° C. to 110° C., from 95° C. to 105° C., or from 95° C. to 100° C. In some embodiments, the polyamide compositions may have a HDT greater than 75° C., e.g., greater than 78° C., greater than 80° C., greater than 85° C., greater than 88° C., or greater than 90° C. In some embodiments, the polyamides may have a HDT less than 110° C., e.g., less than 108° C., less than 105° C., less than 100° C., less than 98° C., or less than 95° C.

In some embodiments, the polyamide composition may have a tensile strength ranging from 63 MPa to 150 MPa, e.g., from 70 MPa to 140 MPa, from 75 MPa to 130 MPa, from 80 MPa to 125 MPa, or from 90 MPa to 110 MPa. In some embodiments, the polyamide composition may have a tensile strength less than 150 MPa, e.g., less than 145 MPa, less than 140 MPa, less than 135 MPa, less than 130 MPa, less than 125 MPa, or less than 115 MPa. In some embodiments, the polyamide composition may have a tensile strength greater than 65 MPa, e.g., greater than 70 MPa, greater than 75 MPa, greater than 80 MPa, greater than 90 MPa, or greater than 100 MPa. Tensile strength may be measured using ASTM D638 (current year).

In some embodiments, the polyamide composition may have a tensile modulus ranging from 4000 MPa to 10,000 MPa, e.g., from 4500 MPa to 9000 MPa, from 5000 MPa to 8000 MPa, from 5200 MPa to 7500 MPa, from 5500 MPa to 7200 MPa, from 5600 MPa to 7000 MPa, or from 5800 MPa to 6500 MPa. In some aspects, the polyamide composition may have a tensile modulus less than 10,000 MPa, e.g., less than 9000 MPa, less than 8500 MPa, less than 8000 MPa, less than 7000 MPa, or less than 6500 MPa. In some aspects, the polyamide composition may have a tensile modulus greater than 4000 MPa, e.g., greater than 4500 MPa, greater than 5000 MPa, greater than 5500 MPa, greater than 6000 MPa, or greater than 6300 MPa. Tensile modulus may be measured using ASTM D638 (current year).

In some embodiments, the polyamide composition may have a flex strength ranging from 120 MPa to 220 MPa, e.g., from 125 MPa to 210 MPa, from 130 MPa to 200 MPa, from 140 MPa to 190 MPa, from 150 MPa to 180 MPa, or from 160 MPa to 170 MPa. In some aspects, the polyamide composition may have a flex strength less than 220 MPa, e.g., less than 210 MPa, less than 200 MPa, less than 190 MPa, less than 180 MPa, or less than 170 MPa. In some aspects, the polyamide composition may have a flex strength greater than 120 MPa, e.g., greater than 125 MPa, greater than 130 MPa, greater than 140 MPa, greater than 150 MPa, or greater than 160 MPa. Flex or flexural strength may be measured using ASTM D790 (current year).

In some embodiments, the polyamide composition may have an elongation ranging from 1% to 5%, e.g., from 1.5% to 4.5%, from 2% to 4%, from 2.5% to 3.5%, or from 2% to 3%. In some aspects, the polyamide composition may have a elongation less than 5%, e.g., less than 4.5%, less than 4.0%, less than 3.5%, less than 3.25%, or less than 3%. In some aspects, the polyamide composition may have a elongation greater than 1%, e.g., greater than 1.5%, greater than 2%, greater than 2.25%, greater than 2.5%, or greater than 2.75%. Elongation may be measured using ASTM D638 (current year).

In some embodiments, the polyamide compositions may have a notched IZOD impact strength ranging from 1.8 kJ/m$^2$ to 5 kJ/m$^2$, e.g., from 2 kJ/m$^2$ to 4.5 kJ/m$^2$, from 2 kJ/m$^2$ to 4 kJ/m$^2$, from 2 kJ/m$^2$ to 4.5 kJ/m$^2$, or from 3 kJ/m$^2$ to 5 kJ/m$^2$. In some embodiments, the polyamide compositions may have a notched IZOD impact strength less than 5 kJ/m$^2$, e.g., less than 4.8 kJ/m$^2$, less than 4.5 kJ/m$^2$, less than 4 kJ/m$^2$, less 3.75 kJ/m$^2$, or less than 3.5 kJ/m$^2$. In some embodiments, the polyamide compositions may have a notched IZOD impact strength greater than 1.8 g/cm$^3$, e.g., greater than 2 kJ/m$^2$, greater than 2.4 kJ/m$^2$, greater than 2.6 kJ/m$^2$, greater than 2.8 kJ/m$^2$, greater than 3 kJ/m$^2$, or greater than 3.2 kJ/m$^2$. Impact strength may be measured using ASTM D256 (current year).

It has been found that polyamide compositions including the specific combination of polyamides, etchable fillers, mineral fillers, and optional additives, improve surface appearance. The surface appearance of the metal-plated injection-molded was characterized by nominal orange peel (R-value) and distinctness of image (DOI). The metal-plated injection molded articles were evaluated using Byk Gardner Wave Scan meter (manufactured by BYK-Gardner, Columbia, Md.) to determine the longwave, shortwave, DOI, R-value and dullness. Each of these properties may be measured using the publicly-available test parameters and procedures established by BYK-Gardner (current year).

DOI is an objective appearance criterion for brilliance and gloss which includes the visual effects from a rough or bumpy coating surface, sometimes referred to as "orange peel." The metal-plated surfaces of the injection-molded articles resulting from the polyamide composition described herein exhibit a high DOI.

The R-value is calculated from longwave and shortwave correlated to the visual rating of the orange peel panels of the company ACT® (USA). The R-value is calculated according to Formula (I):

$$R=10.5-4*\log(a-0.02*|b-20|) \quad (I),$$

The longwave is the variance of the amplitude of the longwave signal, major contribution (a) to R. The shortwave is the variance of the amplitude of the shortwave signal, very minor contribution (b) to R.

Dullness (du) relates to the surface appearance of an article that is determined by stray light that is caused by fine structures with wavelengths less than 0.1 mm. This value is determined by the Byk Gardner Wave Scan meter (manufactured by BYK-Gardner, Columbia, Md.). Low dullness is visually perceived as a deep gloss.

In some embodiments, the injection-molded articles may have a DOI of at least 80, e.g., at least 82, of at least 84, at least 85, at least 86, at least 88, at least 90, at least 92, at least 94, or at least 95. In some aspects, the DOI ranges from 80 to 99.9, e.g., from 82 to 99, from 84 to 98, from 86 to 96, from 88 to 95 or from 90 to 94. In terms of upper limits, the DOI is less than 99.9, e.g., less than 99, less than 98, less than 97, less than 96, or less than 95.5. Values closer to 100 indicate a smoother and glossier surface as determined by the Byk Gardner Wave Scan meter.

The injection-molded articles produced from the polyamide composition have a high R-value as measured by a BYK Gardner Wavescan meter. In some embodiments, the injection-molded articles have R-values of at least 9, e.g., at least 9.2, at least 9.4, at least 9.6, at least 9.7, at least 9.8, at least 9.9, at least 10, at least 10.1, at least 10.2, at least 10.3, at least 10.4, or at least 10.5. In some aspects, the R-value ranges from 9 to 11, e.g., from 9.2 to 10.8, from 9.4 to 10.6, from 9.6 to 10.5, or from 9.8 to 10.4. In terms of upper limits, the R-value is less than 11, e.g., less than 10.9, less than 10.8, less than 10.7, or less than 10.6.

In some embodiments, the injection-molded articles produced from the polyamide composition may have a longwave as measured by a BYK Gardner Wavescan meter from 0.1 to 2, e.g., from 0.2 to 1.8, from 0.4 to 1.6, from 0.5 to 1.5, from 0.6 to 1.4, from 0.7 to 1.2, or from 0.8 to 1.1. In terms of upper limits, the injection-molded articles produced from the polyamide composition may have a longwave less than 2, e.g., less than 1.9, less than 1.8, less than 1.7, less than 1.6, less than 1.5, less than 1.4, less than 1.3, or less than 1.2. In terms of lower limits, the injection-molded articles produced from the polyamide composition may have a longwave greater than 0.1, e.g., greater than 0.2, greater than 0.3, greater than 0.4, greater than 0.5, greater than 0.6, greater than 0.7, greater than 0.8, or greater than 0.9.

In some embodiments, the injection-molded articles produced from the polyamide composition may have a shortwave as measured by a BYK Gardner Wavescan meter from 2 to 20, e.g., from 3 to 18, from 4 to 16, from 5 to 15, from 6 to 14, from 7 to 12, or from 8 to 11. In terms of upper limits, the injection-molded articles produced from the polyamide composition may have a shortwave less than 20, e.g., less than 19, less than 18, less than 17, less than 16, less than 15, less than 14, less than 12, or less than 10. In terms of lower limits, the injection-molded articles produced from the polyamide composition may have a longwave greater than 1, e.g., greater than 1.5, greater than 2, greater than 2.5, greater than 3, greater than 3.5, greater than 4, greater than 5, or greater than 6.

In some embodiments, the injection-molded articles produced from the polyamide composition have a low dullness (du) as measured by a BYK Gardner Wavescan meter. In some embodiments, the injection-molded articles have a dullness ranging from 1 to 20, e.g., from 2 to 18, from 3 to 16, from 4 to 14, from 5 to 12, from 6 to 10, or from 7 to 9. In terms of upper limits, the injection-molded articles have a dullness less than 20, e.g., less than 18, less than 16, less than 15, less than 14, less than 12, or less than 10. In terms of lower limits, the injection-molded articles have a dullness greater than 1, e.g., greater than 1.5, greater than 2, greater than 2.5, greater than 3, greater than 3.5, greater than 4, greater than 5, or greater than 6.

Metal-Plated Injection-Molded Articles

The polyamide compositions described herein can be used to form injection-molded articles that can be used in a variety of applications. Generally, injection-molded articles can be formed by injection molding a polyamide composition and subsequently removing the molded article from the mold and cooling. In some embodiments, the process for preparing an injection-molded article includes: providing any one of the polyamide compositions described herein: heating the polyamide composition; filling a mold cavity with the heated polyamide composition; and cooling the heated polyamide composition to form the injection-molded article It is possible to coat thermoplastic polymers with metals. Such coatings are utilized for aesthetic purposes, e.g., chrome-plating, to improve the mechanical properties of the injection-molded article, and to improve other properties such as electromagnetic shielding. It is desirable for the metal coating to have a strong bond to the surface of the polymer so that the coating is not easily removed or compromised in normal use. It has been found that utilizing an etachable filler, e.g., magnesium hydroxide, coat-treated with a silane coupling agent improves peel strength of the injection-molded article formed from the polyamide composition. In particular, a vinylsilane coating on the etchable filler provides a polymer composition having a higher peel strength than conventional plated injection-molded articles.

The strength of the bond between the metal coating and the injection-molded article may be determined by measuring the peel strength of the metal-polymer interface. Peel strengths/adhesion between polyamide composition and metal coated on the polymer have traditionally only been used for decorative/aesthetic applications due to their poor adhesion performance. Increasing the peel strengths/adhesion between the substrate and deposited metals allows use of the metal coated polyamide article in more demanding higher performance applications.

In some embodiments, the polyamide compositions described herein form injection molding articles that are capable of being metal-plated. The metal may be put onto the inject-molded article using a variety of methods, such as electroless metal deposition, electrolytic plating, vacuum metallization, different sputtering methods, lamination of metal foil onto the thermoplastic, etc. In some embodiments, process of plating the injection-molded article includes etching a filled thermoplastic resin substrate with a dilute acid solution, treating with a sensitizer such as a tin salt, activating with a noble metal salt solution, electroless metal deposition using an electroless copper or nickel plating solution, and electrolytic plating with a metal selected from the group comprising copper, nickel, chromium, or combinations thereof.

Conventionally, chromium has been plated from aqueous chromic acid baths that include chromium in hexavalent form. Other polymer compositions, e.g., ABS and PC/ABS, require the use of hexavalent chromium for etching out butadiene in preparation for chrome plating applications. In this process, the chromic acid fumes emitted as a result of hydrogen evolution present a considerable health hazard. The Center for Disease Control (CDC) has long recognized hexavalent chromium as a well-established carcinogen from exposure to high concentrations of airborne hexavalent chromium during certain applications, e.g., electroplating, welding, and chrome painting. Furthermore, the concentration of chromium in such baths is extremely high, leading to problems of waste or recovery because of so-called "drag-out" of chromium compounds into the rinse tanks which follow the plating bath.

It has been found that injection-molded articles formed from the polyamide compositions described herein can be etched with solutions that do not contain toxic or carcinogenic materials, e.g., hexavalent chromium.

In general, the process for coating or plating a polyamide article with metal comprises several steps. In some embodiments, the polyamide surface is treated by etching the surface of the injection-molded article with an etching solution. The etching solution may comprise an acid, e.g., an acid solution, a dilute acid solution, a concentrated acid mixture, or mixtures thereof. In some aspects, when the disclosed polyamide compositions are used, the use of carcinogenic materials, e.g., hexavalent chromium, are not employed in the etching solution. The polymer surface preparation may include other steps besides etching. After etching, the etched surface of the injection-molded article is plated with a metal comprising one or more of copper, manganese, tin, nickel, iron, chrome, zinc, gold, platinum, cobalt, phosphorus, aluminum, and alloys thereof. In some aspects, the etched surface of the injection-molded article is plated with chrome.

In some embodiments, the surface of the injection-molded article treated with the etching solution is activated with metal ions followed by electroless plating with a metal. The final step is electrolytically plating a metal onto the injection-molded article surface. Certain steps are typically conducted sequentially, in which case it can be advantageous to carry out pretreatments or post treatments (such as washing, cleaning, drying, heating, and partial or full neutralization of pH extremes) while optionally the treating solutions are agitated or undergo ultrasonification during these operations. In some embodiments, the polyamide compositions disclosed herein are capable of being plated using an etching solution comprising low amounts or, if any, hexavalent chromium.

Beneficially, the polyamide compositions produce an injection-molded article with improved peel strength between the article and the metal plating. In some embodiments, the injection-molded articles produced from the polyamide compositions described herein have sufficient adhesion so that it does not separate from the thermoplastic substrate during use. The resulting electroplated articles exhibit a mirror-like finish and a high peel strength. In some aspects, the injection-molded articles are plated with a metal including at least one of copper, manganese, tin, nickel, iron, chrome, zinc, gold, platinum, cobalt, phosphorus, aluminum and alloys of these metals.

In some embodiments, the metal coating can comprise at least one metal in elemental form, alloys of such, or metal matrix composites. The coating may be applied layer by layer, and can have a thickness ranging from 1 microns to 50 microns, e.g., 2 microns to 48 microns, 5 microns to 45 microns, 10 microns to 42 microns, from 15 microns to 40 microns, from 18 microns to 38 microns, from 20 microns to 36 microns, from 25 microns to 35 microns, from 26 microns to 34 microns, or from 28 microns to 32 microns. In some aspects, the thickness of the coating is less than 50 microns, e.g., less than 48 microns, less than 46 microns, less than 44 microns, less than 42 microns, less than 40 microns, less than 38 microns, or less than 35 microns. In some aspects, the thickness of the coating is greater than 1 microns, e.g., greater than 2 microns, greater than 5 microns, greater than 8 microns, greater than 10 microns, greater than 10 microns, greater than 20 microns, or greater than 25 microns.

In some aspects, it is useful to apply more than one layers of different metals in a combination that may offer a desired advantage. For example, a more ductile metal such as copper may be used for the first layer, and a stronger metal, e.g., palladium, nickel, iron, cobalt, tin, or other metals or their alloys, may be used for the outer layer for their strength and hardness. In some aspects, the injection-molded article may be coated with multiple layers comprising one or more of palladium, nickel, electroless nickel, copper, electroless copper, and chrome. In some aspects, the injection-molded article may be provided with a palladium base and treated, e.g., coated, with one or more of nickel, electroless nickel, copper, or chrome.

In some aspects, the polyamide may comprise a copolymer comprising PA-6,6 and PA-6, wherein the copolymer comprises PA-6 ranging from 2 wt. % to 20 wt. %, wherein the composition has a distinctness of image of at least 90 as measured by Byk Gardner Wave Scan meter, wherein the composition has an R-value of at least 10.5 as measured by Byk Gardner Wave Scan meter.

In some aspects, the polyamide may comprise a copolymer comprising PA-6,6, PA-6I, or PA-6, wherein the semi-structural mineral comprises kaolin, wherein the composition has a density less than 1.5 g/cm$^3$, wherein the composition has a distinctness of image of at least 90 as measured by Byk Gardner Wave Scan meter, wherein the composition has an R-value of at least 10.5 as measured by Byk Gardner Wave Scan meter.

Applications where high peel strength is desirable include electrical and electronic components, personal digital assistant (PDA), cell and mobile phone components, computer notebook components, and the like, automotive components, aerospace parts, defense parts, consumer products, medical components and sporting goods. Suitable parts include tubes or shafts used in sporting goods such as ski and hiking poles, fishing rods, golf club shafts, hockey sticks, lacrosse sticks, baseball/softball bats, bicycle frames, skate blades, snow boards. Other applications include plates such as golf club head face plates and complex shapes such as sports racquets (tennis, racquetball, squash and the like), golf club heads, automotive grill-guards, pedals such as brake and gas petals, fuel rails, running boards, spoilers, muffler tips, wheels, vehicle frames, structural brackets, and similar articles. The article, whose surface is to be coated with metal, can be formed by processes such as by injection molding a polymer composition and subsequently removing the molded article from the mold and cooling.

EXAMPLES

A base Example was prepared by blending the following components in the amounts shown in Table 1:

PA-6,6/6 comprising 6 wt. % of PA-6 (polyamide);

vinylsilane-coated magnesium hydroxide, namely, Magnifin® H-10 A from Magnifin GmbH in Bergheim (etchable filler);

kaolin, namely, Hydrite® SB 100s from Imerys Kaolin (semi-structural mineral);

nigrosine pigment from Orient Chemicals (NA-143) (additive);

zinc stearate (NA-095) (additive); and

NYLOSTAB S-EED (hindered amine stabilizer marketed by Clariant GmbH, Augsburg, Germany (additive), and described as 1,3-benzendicarboxamide, N, N'-bis(2,2, 6,6-tetramethyl-4-piperidinyl).

TABLE 1

| Components | Example (wt. %) |
| --- | --- |
| PA-66/6 | 60.7 |
| Vinylsilane Coated Magnesium Hydroxide | 10.0 |
| Kaolin | 25.0 |
| NYLOSTAB S-EED | 0.75 |
| Nigrosine | 3.5 |
| Zinc Stearate | 0.1 |

Injection-molded articles were formed in accordance with the methods discussed herein and using the base Example. The injection molded articles generally demonstrated a superior combination of aesthetic properties and improved structural properties as compared to injection-molded articles formed from traditional polyamide compositions.

Examples 1-6 and Comparative Examples 1 and 2 were prepared by blending the following components in the amounts shown in Table 2. All weight percentages (wt. %) are based on the total weight of the polyamide composition.

TABLE 2

| | PA6,6/6I (wt. %) | Etchable Filler (wt. %) | | Semi-structural Mineral (wt. %) | | Glass Fiber (Wt. %) | NYLOSTAB S-EED (Wt. %) |
| --- | --- | --- | --- | --- | --- | --- | --- |
| Comp. 1 | 60.53 | 15 | MDH-NH2 | 20 | Suzorite Mica | 0 | 0.75 |
| Comp. 2 | 60.53 | 15 | MDH-NH2 | 20 | Wollastonite | 0 | 0.75 |
| Example 1 | 60.53 | 15 | MDH-NH2 | 20 | Translink 555 | 0 | 0.75 |
| Example 2 | 60.53 | 15 | MDH-NH2 | 20 | Polarite 702A | 0 | 0.75 |
| Example 3 | 60.53 | 15 | MDH-NH2 | 20 | Polarite 502A | 0 | 0.75 |
| Example 4 | 60.53 | 15 | MDH-NH2 | 20 | XP17-0027 | 0 | 0.75 |
| Example 5 | 60.53 | 15 | MDH-NH2 | 20 | Hydrite SB100S | 0 | 0.75 |
| Example 6 | 60.53 | 15 | MDH-NH2 | 20 | XP17-0028 | 0 | 0.75 |

Examples 1-6 and Comparative Examples 1 and 2 each include 60.53 wt. % of PA6,6/6I having 15% PA6I (polyamide), 15 wt. % of amine-coated magnesium hydroxide (etchable filler), 0.75 wt. % NYLOSTAB S-EED (additive), and no glass fibers. Each of the examples and comparative examples further comprised 20 wt. % of semi-structural mineral; however, different types of semi-structural minerals were used as shown in Table 2.

Examples 1-6 and Comparative Examples 1 and 2 were tested for aesthetic properties. The results are displayed in Table 3. As shown, the type of semi-structural mineral has a significant impact on the aesthetic qualities of the polyamide.

TABLE 3

| | Long-wave | Short-wave | R-Value | DOI | Du |
| --- | --- | --- | --- | --- | --- |
| Comp. 1 | Too dull | Too dull | Too dull | Too dull | 50 |
| Comp. 2 | 2.2 | 16.9 | 9.9 | 76.3 | 36.9 |
| Example 1 | 0.9 | 7.8 | 10.5 | 93.3 | 7 |
| Example 2 | 1.1 | 8.9 | 10.5 | 92.9 | 7.6 |
| Example 3 | 1.4 | 10.5 | 10.5 | 90.2 | 12.8 |
| Example 4 | 1.2 | 10.1 | 10.5 | 86.2 | 19.9 |
| Example 5 | 1.3 | 11 | 10.5 | 85.7 | 21.2 |
| Example 6 | 2 | 16.6 | 10 | 89.6 | 12.1 |

Each of Examples 1-6 unexpectedly exhibited desirable combinations of aesthetic properties. Specifically, Example 1, which comprised TRANSLINK 555, exhibited the best surface appearance characters, e.g., good R-value, DOI, and Du. Similarly, Examples 2 and 3, which comprised POLARITE 702A and 502A, respectively, exhibited very good surface appearance values similar to Example 1. Examples 4 and 5 each had good R-value and a moderate DOI and Example 6 had a moderate R-value and good DOI.

In contrast, Comparative Example 1, which comprised mica, resulted in an injection-molded polyamide with very poor surface appearance. Mica has an aspect ratio of approximately 80:1, which contributed to the poor surface appearance. Specifically, the polyamide composition of Comparative Example 1 produced an injection-molded polyamide that had a surface appearance that was too dull to measure. Comparative Example 2 comprised wollastonite as the semi-structural mineral. Although the injection-molded polyamide produced from Comparative Example 2 had a good R-value, it resulted in a very poor DOI and Du.

As shown in Tables 3 and 4, the injection molded articles formed from the polyamide compositions of Examples 1-6 also exhibited mechanical properties desirable for injection-molded articles in addition to the aforementioned aesthetic properties. In particular, Examples 4 and 5 exhibited good physical properties, e.g., tensile strength, flex strength, elongation, and peel strength values, and also had good surface appearance, e.g., good R-value and DOI. Comparative Examples 1 and 2, on the other hand, achieved moderate/good physical properties, but the surface aesthetic properties of these injection molded articles was poor.

(semi-structural mineral). Example 9 uses a different polyamide (PA6,6/6) than Examples 7 and 8.

As shown in Table 6, each of Examples 7-9 exhibited very good surface appearance. Specifically, Examples 7-9 each had high R-values, a good DOI, and low Du. Also, as shown in Table 7, each of Examples 7-9 had a HDT greater than 90° C., a tensile strength greater than 75, and a flex strength greater than or equal to 145 MPa. Surprisingly, the polyamide compositions of Examples 7-9 comprising both etchable filler and specific semi-structural minerals had good surface appearance properties and physical properties, whereas Comparative Examples 3-5 did not have a balance of aesthetic and physical properties.

In contrast, while Comparative Examples 3 and 4 exhibited good surface appearance, they exhibited very poor mechanical properties. Comparative Example 5, which did not utilize the specific semi-structural minerals disclosed herein, e.g., utilized wollastonite or mica, had very poor surface appearance. As shown in Table 7, Comparative Examples 3 and 4 had a tensile strength less than 75, e.g., less than 65, a tensile modulus less than 6,500, and flex strength less than 130. The injection-molded polyamides prepared from Comparative Examples 3 and 4 also had poor peel strength values. While Comparative Example 5 per-

TABLE 4

|  | HDT (° C.) | Tensile Strength (MPa) | Tensile Modulus (MPa) | IZOD Impact (kJ/m²) | Flex Strength (MPa) | Flex Modulus (MPa) | Density (g/cm³) | Elongation (%) | Tensile Method | Melting Point (° C.) | Peel Strength (Side A) | Peel Strength (Side B) |
|---|---|---|---|---|---|---|---|---|---|---|---|---|
| Comp. 1 | 115 | 82 | 6,575 | 1.8 | 129 | 6,973 | 1.40 | 1.7 | Tens-B | 250 | — | — |
| Comp. 2 | 114 | 98 | 6,447 | 2.2 | 157 | 6,725 | 1.42 | 2.2 | Tens-B | 251 | 12.0 | 8.5 |
| Example 1 | 93 | 73 | 5,534 | 2.2 | 146 | 6,037 | 1.42 | 1.6 | Tens-B | 250 | 9.9 | 7.8 |
| Example 2 | 91 | 69 | 5,508 | 2.0 | 134 | 5,901 | 1.40 | 1.5 | Tens-B | 246 | 6.6 | 5.9 |
| Example 3 | 94 | 82 | 5,176 | 2.4 | 135 | 5,339 | 1.40 | 2.0 | Tens-B | 251 | 9.1 | 7.8 |
| Example 4 | 106 | 86 | 6,330 | 2.1 | 144 | 7,002 | 1.40 | 1.8 | Tens-B | 251 | 14.9 | 12.0 |
| Example 5 | 113 | 88 | 6,425 | 2.0 | 146 | 6,993 | 1.40 | 1.8 | Tens-B | 252 | 13.9 | 10.3 |
| Example 6 | 100 | 72 | 5,520 | 1.8 | 122 | 5,828 | 1.40 | 1.6 | Tens-B | 252 | 10.1 | 7.1 |

Examples 7-9 and Comparative Examples 3-5 were prepared by blending the following components in the amounts shown in Table 5.

formed better with regard to mechanical properties, it demonstrated very poor surface appearance, e.g., an R-value less than 10.

TABLE 5

|  | PA6,6/6I (wt. %) | PA6,6/6 (wt. %) | Etchable Filler (wt. %) | Semi-structural Mineral (wt. %) | Glass Fiber (Wt. %) | NYLOSTAB S-EED (Wt. %) |
|---|---|---|---|---|---|---|
| Comp. 3 | 55.70 | — | 40 H-10 IV | None | 0 | 0.75 |
| Comp. 4 | 55.70 | — | 40 H-10 A | None | 0 | 0.75 |
| Comp. 5 | 55.70 | — | None | 40 Wollastonite | 0 | 0.75 |
| Example 7 | 55.26 | — | 20 MDH-NH2 | 20 Translink 555 | 0 | 0.75 |
| Example 8 | 51.61 | — | 25 MDH-NH2 | 19 Translink 555 | 0 | 0.75 |
| Example 9 | — | 55.26 | 20 MDH-NH2 | 20 Translink 555 | 0 | 0.75 |

The polyamide compositions of Comparative Examples 3-5 each comprised 55.70 wt. % of PA6,6,6I (15% PA6I). Comparative Examples 3 and 4 did not include a semi-structural mineral and Comparative Example 5 included 40 wt. % wollastonite as the semi-structural mineral. These examples demonstrate the effects on surface appearance and physical properties of: 1) utilizing specific semi-structural minerals and 2) the amount of PA6I component (in the PA6,6,6I copolymer). Examples 7 and 8 each include different amounts of PA6,6,6I (12% PA6I), silane-coated magnesium hydroxide (etchable filler), and TRANSLINK 555

TABLE 6

|  | Long-wave | Short-wave | R-Value | DOI | Du |
|---|---|---|---|---|---|
| Comp. 3 | 0.9 | 6.6 | 10.5 | 93.9 | 6 |
| Comp. 4 | 1 | 8.3 | 10.5 | 92.9 | 7.6 |
| Comp. 5 | 5.8 | 32.8 | 8.5 | 72.5 | 41.9 |
| Example 7 | 1 | 8.6 | 10.5 | 92.5 | 8.6 |
| Example 8 | 0.9 | 6.3 | 10.5 | 93.2 | 7.4 |
| Example 9 | 1.1 | 8.7 | 10.5 | 92 | 9.7 |

TABLE 7

| | HDT (° C.) | Tensile Strength (MPa) | Tensile Modulus (MPa) | IZOD Impact (kJ/m$^2$) | Flex Strength (MPa) | Flex Modulus (MPa) | Density (g/cm$^3$) | Elongation (%) | Tensile Method | Melting Point (° C.) | Peel Strength (Side A) | Peel Strength (Side B) |
|---|---|---|---|---|---|---|---|---|---|---|---|---|
| Comp. 3 | 85 | 62 | 6,301 | 4.0 | 127 | 6,097 | 1.43 | 1.1 | Tens-A | — | 8.2 | 2.2 |
| Comp. 4 | 84 | 59 | 6,206 | 2.5 | 123 | 6,049 | 1.43 | 1.0 | Tens-A | — | 8.4 | 6.8 |
| Comp. 5 | 171 | 124 | 11,446 | 5.6 | 213 | 10,908 | 1.51 | 2.7 | Tens-A | — | 15.0 | 5.2 |
| Example 7 | 95 | 80 | 7,288 | 3.6 | 147 | 6,991 | 1.49 | 1.4 | Tens-A | — | 10.3 | 6.3 |
| Example 8 | 92 | 77 | 7,393 | 3.6 | 148 | 6,932 | 1.50 | 1.2 | Tens-A | — | 10.8 | 6.9 |
| Example 9 | 94 | 76 | 6,467 | 3.8 | 145 | 6,228 | 1.46 | 1.5 | Tens-A | — | 10.3 | 8.1 |

Table 8 shows polyamide compositions having different semi-structural mineral systems. Examples 10-13 each comprise PA6,6,6I (15% PA6I), 13 wt. % of silane-coated magnesium hydroxide (etchable fillers), and 29 wt. % of different semi-structural mineral systems. Examples 11 and Example 13 comprise 0.5325 wt. % NYLOSTAB S-EED, and Examples 11 and 12 comprise 0.75 wt. % NYLOSTAB S-EED. Examples 10-13 were prepared by blending the following components in the amounts shown in Table 8.

TABLE 8

| | PA6,6/6I (wt. %) | Etchable Filler (wt. %) | | Semi-structural Mineral (wt. %) | | Glass Fiber (Wt. %) | NYLOSTAB S-EED (Wt. %) |
|---|---|---|---|---|---|---|---|
| Example 10 | 53.76 | 13 | MDH-NH2 | 29 | Polarite 402A | 0 | 0.5325 |
| Example 11 | 53.76 | 13 | MDH-NH2 | 29 | Translink 555 | 0 | 0.75 |
| Example 12 | 54.04 | 13 | MDH-NH2 | 29 | Translink 555 + 1% MgO | 0 | 0.75 |
| Example 13 | 54.04 | 13 | MDH-NH2 | 29 | 75% Translink 555, 25% Hydrite SB100S + 1% MgO | 0 | 0.5325 |

As shown in Tables 9 and 10, Examples 10-13 exhibited good/moderate surface appearance properties while maintaining good mechanical properties. Specifically, each of Examples 10-12, exhibited better surface appearance properties, e.g., good R-value, good DOI and low Du, than Example 13. Example 13 comprised Hydrite® SB 100S which slightly reduced the DOI and Du compared to Examples 10-12. Example 10 comprised Polarite 402A as the semi-structural mineral which performed comparably to Translink 555 used in Examples 11 and 12.

TABLE 9

| | Long-wave | Short-wave | R-Value | DOI | Du |
|---|---|---|---|---|---|
| Example 10 | 0.9 | 7.2 | 10.5 | 93.4 | 6.9 |
| Example 11 | 1 | 7.5 | 10.5 | 93.1 | 7.3 |
| Example 12 | 0.9 | 6.2 | 10.5 | 93.1 | 7.8 |
| Example 13 | 1.4 | 10.3 | 10.5 | 88.1 | 16.9 |

As shown in Table 10, Example 13 had the best physical properties. Specifically, the tensile strength of the injection-molded polyamide prepared from Example 13 was the highest among the examples. It was unexpectedly found that a semi-structural mineral system comprising Hydrite® SB 100s improved the physical properties of the injection-molded polyamide while only slightly reducing surface appearance properties. For example, Example 13 had a greater HDT, tensile modulus, flex strength, and peel strengths than the other examples, but lower DOI and Du.

TABLE 10

| | HDT (° C.) | Tensile Strength (MPa) | Tensile Modulus (MPa) | IZOD Impact (kJ/m$^2$) | Flex Strength (MPa) | Flex Modulus (MPa) | Density (g/cm$^3$) | Elongation (%) | Peel Strength (Side A) | Peel Strength (Side B) |
|---|---|---|---|---|---|---|---|---|---|---|
| Example 10 | 92 | 66 | 6,638 | 3.6 | 151 | 6,353 | 1.47 | 1.1 | 6.2 | 2.3 |
| Example 11 | 94 | 68 | 6,933 | 3.2 | 144 | 6,708 | 1.48 | 1.1 | 7.8 | 2.3 |
| Example 12 | 97 | 63 | 7,136 | 3.1 | 151 | 6,733 | 1.49 | 1.0 | 5.3 | 3.1 |
| Example 13 | 107 | 80 | 7,764 | 2.7 | 154 | 7,579 | 1.50 | 1.3 | 10.2 | 7.3 |

Comparative Example 6 and Examples 14 and 15 were prepared by blending the following components in the amounts shown in Table 11. Each of the examples comprised 13 wt. % of Magnifin® H-10 IV, 29 wt. % of different semi-structural mineral systems, and no glass fibers. This set of examples investigated the impact of a nucleating agent in the polyamide composition on surface appearance and mechanical properties. Examples 14 and 15 comprised a copolymer of PA6,6/6I and a semi-structural mineral composition that comprised a combination of nucleating agent (P22) and Translink 555. Comparative Example 6 had a semi-structural mineral composition that included wollastonite in combination with a nucleating agent (P22) and Translink 555.

TABLE 11

| | PA6,6/6 (wt. %) | Etchable Filler (wt. %) | | Semi-structural Mineral (wt. %) | Glass Fiber (Wt. %) | NYLOSTAB S-EED (Wt. %) |
|---|---|---|---|---|---|---|
| Comp. 6 | 54.20 | 13 | H-10 IV | 29 Nucleating Agent (P22), 21.75% Translink 555, 7.25% Wollastonite | 0 | 0% |
| Example 14 | 54.20 | 13 | H-10 IV | 29 Nucleating Agent (P22), 29% Translink 555 | 0 | 0% |
| Example 15 | 54.20 | 13 | H-10 IV | 29 Nucleating Agent (P22), 21.75% Translink 555, 7.25% SB100S | 0 | 0% |

As shown in Table 12, Comparative Example 6 (with wollastonite) had very poor surface appearance. In fact, Comparative Example 6 had an R-value less than 10 and a high Du. In contrast, Examples 14 and 15, which did not include any wollastonite, had an R-value that was approximately 10.5 and a Du less than 20. The nucleating agent in combination with Translink 555 (and semi-structural mineral other than wollastonite) unexpectedly exhibited good surface appearance qualities despite high semi-structural mineral loadings.

TABLE 12

| | R-Value | DOI | Du |
|---|---|---|---|
| Comp. 6 | 9.1 | 78.6 | 32.7 |
| Example 14 | 10.5 | 87.3 | 19.2 |
| Example 15 | 10.4 | 88.5 | 17.4 |

As provided in Table 13, Examples 14 and 15 show that the use of PA6,6/6 in the polyamide composition, in combination with the other components, exhibited moderate/good surface appearance and mechanical properties. Examples 14 and 15 exhibited good physical properties, e.g., tensile strength, flex strength, and elongation values, and also had good surface appearance, e.g., good R-value and moderate DOI. In particular, Example 15, which included Hydrite® SB 100s in the semi-structural mineral system, had improved physical properties than Example 14. Although Comparative Example 6 had very good mechanical properties, the inclusion of wollastonite resulted in very poor surface appearance.

TABLE 13

|  | HDT (° C.) | Tensile Strength (MPa) | Tensile Modulus (MPa) | IZOD Impact (kJ/m$^2$) | Flex Strength (MPa) | Flex Modulus (MPa) | Density (g/cm$^3$) | Elongation (%) | Melting Point (° C.) |
| --- | --- | --- | --- | --- | --- | --- | --- | --- | --- |
| Comp. 6 | 159 | 94 | 8,239 | 2.4 | 150 | 7,636 | 1.49 | 1.7 | 246 |
| Example 14 | 112 | 79 | 6,917 | 2.7 | 142 | 6,366 | 1.48 | 1.5 | 246 |
| Example 15 | 119 | 84 | 6,943 | 2.2 | 148 | 7,108 | 1.48 | 1.6 | 245 |

EMBODIMENTS

The following embodiments are contemplated. All combinations of features and embodiments are contemplated.

Embodiment 1

A polyamide composition comprising: from 45 wt. % to 75 wt. % of an polyamide; from 2 wt. % to 40 wt. % of an etchable filler; from 10 wt. % to 40 wt. % of a semi-structural mineral; and optionally from 0.1 wt. % to 13 wt. % of additive.

Embodiment 2

An embodiment of embodiment 1, wherein the polyamide comprises PA-6, PA-6,6, PA4,6, PA-6,9, PA-6,10, PA-6,12, PA11, PA12, PA9,10, PA9,12, PA9,13, PA9,14, PA9,15, PA-6,16, PA9,36, PA10,10, PA10,12, PA10,13, PA10,14, PA12,10, PA12,12, PA12,13, PA12,14, PA-6,14, PA-6,13, PA-6,15, PA-6,16, PA-6,13, PAMXD,6, PA4T, PA5T, PA-6T, PA9T, PA10T, PA12T, PA4I, PA5I, PA-6I, PA10I, copolymers, terpolymers, and mixtures thereof.

Embodiment 3

An embodiment of any of embodiments 1 or 2, wherein the polyamide is a copolymer comprising PA-6,6 and PA-6.

Embodiment 4

An embodiment of embodiment 3, wherein the copolymer comprises PA-6 ranging from 2 wt. % to 20 wt. %.

Embodiment 5

An embodiment of any of the preceding embodiments, wherein the additive includes at least one of: inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, fibrous materials and particulate fillers Embodiment 6

An embodiment of embodiment 5, wherein the additive comprises from 1 wt. % to 10 wt. % of pigment, from 0.05 wt. % to 1 wt. % of lubricant, and/or from 0.25 wt. % to 2 wt. % of processing aid.

Embodiment 7

An embodiment of any of embodiments 5 or 6, wherein the pigment comprises a thermally stable nigrosine.

Embodiment 8

An embodiment of any of embodiments 5 or 6, wherein the lubricant comprises zinc stearate.

Embodiment 9

An embodiment of any of embodiments 5 or 6, wherein the processing aid comprises a substituted piperidine compound.

Embodiment 10

An embodiment of any of the preceding embodiments, wherein the etchable filler is coated with an organosilane coating.

Embodiment 11

An embodiment of embodiment 10, wherein the organosilane coating comprises vinylsilane.

Embodiment 12

An embodiment of embodiment 10, wherein the organosilane coating comprises aminosilane.

Embodiment 13

An embodiment of any of the preceding embodiments, wherein the etchable filler comprises one or more of magnesium hydroxide, and calcium carbonate.

Embodiment 14

An embodiment of any of the preceding embodiments, wherein the composition does not comprise any glass fibers.

Embodiment 15

An embodiment of any of the preceding embodiments, wherein the semi-structural mineral comprises one or more of kaolin and talc.

Embodiment 16

An embodiment of any of the preceding embodiments, wherein the composition has a distinctness of image of at least 85 as measured by Byk Gardner Wave Scan meter

Embodiment 17

An embodiment of any of the preceding embodiments, wherein the composition has an R-value greater than 10 as measured by Byk Gardner Wave Scan meter.

Embodiment 18

An embodiment of any of the preceding embodiments, wherein the composition has a density less than 1.5 g/cm$^3$.

Embodiment 19

An embodiment of any of the preceding embodiments, wherein the composition has a melting point ranging from 220° C. to 260° C.

Embodiment 20

An embodiment of any of the preceding embodiments, wherein the polyamide is a copolymer comprising PA-66 and PA-6, wherein the copolymer comprises PA-6 ranging from 2 wt. % to 20 wt. %, wherein the composition has a distinctness of image of at least 90 as measured by Byk Gardner Wave Scan meter, wherein the composition has an R-value greater than 10 as measured by Byk Gardner Wave Scan meter.

Embodiment 21

An embodiment of any of the preceding embodiments, wherein the polyamide is a copolymer comprising PA-6,6, PA-6I, or PA-6, wherein the semi-structural mineral comprises kaolin, wherein the composition has a density less than 1.5 g/cm$^3$, wherein the composition has a distinctness of image of at least 90 as measured by Byk Gardner Wave Scan meter, wherein the composition has an R-value greater than 10 as measured by Byk Gardner Wave Scan meter.

Embodiment 22

An injection-molded article formed from the composition of any one of the preceding embodiments.

Embodiment 23

An embodiment of embodiment 22, wherein the injection-molded article is plated with a metal comprising one or more of copper, manganese, tin, nickel, iron, chrome, zinc, gold, platinum, cobalt, phosphorus, aluminum, and alloys thereof.

Embodiment 24

An embodiment of embodiment 23, wherein the injection-molded article is plated with chrome.

Embodiment 25

A polyamide composition comprising: from 45 wt. % to 75 wt. % of an polyamide; from 2 wt. % to 40 wt. % of a silane-coated magnesium hydroxide; from 10 wt. % to 40 wt. % of kaolin; and optionally from 0.1 wt. % to 13 wt. % of additive.

Embodiment 26

An embodiment of embodiment 25, wherein the additive includes at least one inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, fibrous materials and particulate fillers.

Embodiment 27

An embodiment of embodiment 26, wherein the additive comprises from 1 wt. % to 10 wt. % of nigrosine, from 0.05 wt. % to 1 wt. % of zinc stearate, from 0.25 wt. % to 2 wt. % of a substituted piperidine compound.

Embodiment 28

A process for preparing an injection-molded article comprising: providing a polyamide composition comprising: from 45 wt. % to 75 wt. % of an polyamide; from 2 wt. % to 40 wt. % of an etchable filler; from 10 wt. % to 40 wt. % of a semi-structural mineral; and optionally from 0.1 wt. % to 13 wt. % of additive; heating the polyamide composition; filling a mold cavity with the heated polyamide composition; and cooling the heated polyamide composition to form the injection-molded article.

Embodiment 29

An embodiment of embodiment 28, further comprising etching a surface of the injection-molded article with an etching solution.

Embodiment 30

An embodiment of any of embodiments 28 or 29, wherein the etching solution does not comprise any hexavalent chromium.

Embodiment 31

An embodiment of any of embodiments 28 to 30, further comprising plating the etched surface of the injection-molded article with a metal comprising one or more of copper, manganese, tin, nickel, iron, chrome, zinc, gold, platinum, cobalt, phosphorus, aluminum, and alloys thereof.

Embodiment 32

An embodiment of any of embodiments 28 to 31, wherein the etched surface of the injection-molded article is plated with chrome.

Embodiment 33

An embodiment of any of embodiments 28 to 32, wherein the additive includes at least one of: inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, fibrous materials and particulate fillers.

Embodiment 34

A polyamide composition comprising: from 45 wt. % to 75 wt. % of a polyamide; from 2 wt. % to 40 wt. % of an etchable filler; from 10 wt. % to 40 wt. % of a semi-structural mineral; and optionally from 0.1 wt. % to 13 wt. % of additive; wherein the semi-structural mineral and/or etchable filler does not include mica or wollastonite; wherein the composition has an R-value of at least 10 as measured by Byk Gardner Wave Scan meter.

Embodiment 35

An embodiment of embodiment 34, wherein the polyamide comprises one or more of PA-6, PA-6,6, PA4,6, PA-6,9, PA-6,10, PA-6,12, PA11, PA12, PA9,10, PA9,12, PA9,13, PA9,14, PA9,15, PA-6,16, PA9,36, PA10,10, PA10,12, PA10,13, PA10,14, PA12,10, PA12,12, PA12,13, PA12,14, PA-6,14, PA-6,13, PA-6,15, PA-6,16, PA-6,13, PAMXD,6, PA4T, PA5T, PA-6T, PA9T, PA10T, PA12T, PA4I, PA5I, PA-6I, PA10I, copolymers, terpolymers, and mixtures thereof.

Embodiment 36

An embodiment of embodiment 34, wherein the polyamide is a copolymer comprising PA-6,6 and PA-6, wherein the copolymer comprises PA-6 ranging from 2 wt. % to 20 wt. %.

Embodiment 37

An embodiment of embodiment 34, wherein the additive includes at least one of: inorganic stabilizers, organic stabilizers, flame retardants, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, flow aids, fibrous materials and particulate fillers.

Embodiment 38

An embodiment of embodiment 34, wherein the additive comprises from 1 wt. % to 10 wt. % of pigment, from 0.05 wt. % to 1 wt. % of lubricant, and/or from 0.25 wt. % to 2 wt. % of processing aid.

Embodiment 39

An embodiment of embodiment 34, wherein the pigment comprises a thermally stable nigrosine and wherein the lubricant comprises zinc stearate.

Embodiment 40

An embodiment of embodiment 34, wherein the etchable filler is coated with one or more of an organosilane coating, a vinylsilane coating, or an aminosilane coating, wherein the etchable filler comprises one or more of magnesium hydroxide or calcium carbonate.

Embodiment 41

An embodiment of embodiment 34, wherein the composition does not comprise any glass fibers.

Embodiment 42

An embodiment of embodiment 34, wherein the semi-structural mineral comprises one or more of kaolin or talc.

Embodiment 43

An embodiment of embodiment 34, wherein the composition has a distinctness of image of at least 85 as measured by Byk Gardner Wave Scan meter.

Embodiment 44

An embodiment of embodiment 34, wherein the composition has an R-value of at least 10.5 as measured by Byk Gardner Wave Scan meter.

Embodiment 45

An embodiment of embodiment 34, wherein the composition has a density less than 1.5 g/cm$^3$, and wherein the composition has a melting point ranging from 220° C. to 260° C.

Embodiment 46

An embodiment of embodiment 34, wherein the polyamide is a copolymer comprising PA-66 and PA-6, wherein the copolymer comprises PA-6 ranging from 2 wt. % to 20 wt. %, wherein the composition has a distinctness of image of at least 90 as measured by Byk Gardner Wave Scan meter, wherein the composition has an R-value of at least 10.5 as measured by Byk Gardner Wave Scan meter.

Embodiment 47

An embodiment of embodiment 34, wherein the polyamide is a copolymer comprising PA-6,6, PA-6I, or PA-6, wherein the semi-structural mineral comprises kaolin, wherein the composition has a density less than 1.5 g/cm$^3$, wherein the composition has a distinctness of image of at least 90 as measured by Byk Gardner Wave Scan meter, wherein the composition has an R-value of at least 10.5 as measured by Byk Gardner Wave Scan meter.

Embodiment 48

An injection-molded article is formed from the composition of embodiment 34.

Embodiment 49

An embodiment of embodiment 48, wherein the injection-molded article is plated with a metal comprising one or more of copper, manganese, tin, nickel, iron, chrome, zinc, gold, platinum, cobalt, phosphorus, aluminum, and alloys thereof.

Embodiment 50

An embodiment of embodiment 48, wherein the injection-molded article is plated with chrome in the absence of hexavalent chromium.

Embodiment 51

A polyamide composition comprising: from 45 wt. % to 75 wt. % of an polyamide; from 2 wt. % to 40 wt. % of a silane-coated magnesium hydroxide; from 10 wt. % to 40 wt. % of kaolin; and optionally from 0.1 wt. % to 13 wt. % of additive, wherein the semi-structural mineral and/or etchable filler does not include mica or wollastonite; wherein the composition has a distinctness of image of at least 85 as measured by Byk Gardner Wave Scan meter and a tensile strength of at least 63 MPa.

Embodiment 52

An embodiment of embodiment 51, wherein the additive comprises from 0.5 wt. % to 5 wt. % of nigrosine, from 0.05 wt. % to 1 wt. % of zinc stearate, from 0.25 wt. % to 2 wt. % of a substituted piperidine compound.

Embodiment 53

An embodiment of embodiment 51, wherein the additive further comprises a nucleating agent.

While the disclosure has been described in detail, modifications within the spirit and scope of the disclosure will be readily apparent to those of skill in the art. In view of the foregoing discussion, relevant knowledge in the art and references discussed above in connection with the Background and Detailed Description, the disclosures of which are all incorporated herein by reference. In addition, it should be understood that embodiments of the disclosure and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art.

We claim:

1. A polyamide composition consisting of:
   from 45 wt. % to 75 wt. % of a polyamide, wherein the polyamide is PA-6,6/6, PA-6,6/6I, or PA-6,6/6I/6, or combinations thereof, and the polyamide comprises greater than 65 wt. % 6,6 units;
   greater than 2 wt. % and less than 18 wt. % of an magnesium hydroxide;
   from 10 wt. % to 40 wt. % of a semi-structural mineral; and
   from 0.1 wt. % to 13 wt. % of additive;
   wherein the semi-structural mineral does not include mica or wollastonite;
   wherein the composition has an R-value of at least 10 as measured by Byk Gardner Wave Scan meter; and
   wherein the additive comprises inorganic stabilizers, organic stabilizers, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, and flow aids, wherein the composition does not comprise any glass fibers.

2. The composition of claim 1, wherein the polyamide comprises PA-6,6 units and from 1 wt. % to 25 wt. % PA-6 units.

3. The composition of claim 1, wherein the magnesium hydroxide is coated with one or more of an organosilane coating, a vinylsilane coating, or an aminosilane coating.

4. The composition of claim 1, wherein the magnesium hydroxide comprises a silane coupling agent and has an average particle size ranging from 0.1 microns to 2.0 microns.

5. The composition of claim 1, wherein the additive comprises from 1 wt. % to 10 wt. % of pigment, from 0.05 wt. % to 1 wt. % of lubricant, and/or from 0.25 wt. % to 2 wt. % of processing aid.

6. The composition of claim 5, wherein the pigment comprises a thermally stable nigrosine and wherein the lubricant comprises zinc stearate.

7. The composition of claim 1, wherein the semi-structural mineral comprises one or more of kaolin or talc.

8. The composition of claim 1, wherein the composition has a distinctness of image of at least 85 as measured by Byk Gardner Wave Scan meter.

9. The composition of claim 1, wherein the R-value is at least 10.5 as measured by Byk Gardner Wave Scan meter.

10. The composition of claim 1, wherein the composition has a density less than 1.5 g/cm$^3$ and a melting point ranging from 220° C. to 260° C.

11. The composition of claim 1, wherein the composition has a distinctness of image of at least 90 as measured by Byk Gardner Wave Scan meter and an R-value of at least 10.5 as measured by Byk Gardner Wave Scan meter.

12. The composition of claim 1, the semi-structural mineral comprises kaolin, wherein the composition has a density less than 1.5 g/cm$^3$, wherein the composition has a distinctness of image of at least 90 as measured by Byk Gardner Wave Scan meter and an R-value of at least 10.5 as measured by Byk Gardner Wave Scan meter.

13. A polyamide composition consisting of:
   from 45 wt. % to 75 wt. % of a an polyamide , wherein the polyamide is PA-6,6/6, PA-6,6/6I, or PA-6,6/6I/6, or combinations thereof, and the polyamide comprises greater than 65 wt. % 6,6 units;
   greater than 2 wt. % and less than 18 wt. % of a silane-coated magnesium hydroxide;
   from 10 wt. % to 40 wt. % of kaolin; and
   from 0.1 wt. % to 13 wt. % of additive,
   wherein the composition has a distinctness of image of at least 85 as measured by Byk Gardner Wave Scan meter and a tensile strength of at least 63 MPa as measured by ASTM D638; and
   wherein the additive comprises inorganic stabilizers, organic stabilizers, lubricants, dyes, pigments, nucleating agents, metal flakes, impact modifiers, antistatic agents, conductivity additives, mold-release agents, optical brighteners, adhesion promoters, ageing inhibitors, antioxidants, antiozonants, light stabilizers, UV stabilizers, UV absorbers, UV blockers, inorganic heat stabilizers, organic heat stabilizers, processing aids, crystallization accelerators, crystallization retarders, and flow aids, wherein the composition does not comprise any glass fibers.

14. The composition of claim 13, wherein the silane-coated magnesium hydroxide has an average particle size ranging from 0.1 microns to 2.0 microns.

15. The composition of claim 13, wherein the additive comprises a nucleating agent.

16. The composition of claim 13, wherein the additive comprises from 0.5 wt. % to 5 wt. % of nigrosine, from 0.05 wt. % to 1 wt. % of zinc stearate, from 0.25 wt. % to 2 wt. % of a substituted piperidine compound.

17. An injection-molded article formed from the composition of claim 1.

18. The injection-molded article of claim 17, wherein the injection-molded article is plated with a metal comprising one or more of copper, manganese, tin, nickel, iron, chrome, zinc, gold, platinum, cobalt, phosphorus, aluminum, and alloys thereof.

19. The injection-molded article of claim 17, wherein the injection-molded article is plated with chrome in the absence of hexavalent chromium.

* * * * *